United States Patent
Kosugi et al.

(10) Patent No.: US 11,031,786 B2
(45) Date of Patent: Jun. 8, 2021

(54) POWER CONVERTOR, POWER GENERATION SYSTEM, AND POWER GENERATION CONTROL METHOD

(71) Applicant: TAIYO YUDEN CO., LTD., Tokyo (JP)

(72) Inventors: Akifumi Kosugi, Gunma (JP); Hiroshi Okawa, Gunma (JP); Yoshitugu Iijima, Gunma (JP); Masataka Sashikata, Gunma (JP); Yoji Imai, Gunma (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/672,428

(22) Filed: Nov. 1, 2019

(65) Prior Publication Data
US 2020/0144825 A1    May 7, 2020

(30) Foreign Application Priority Data
Nov. 6, 2018    (JP) .............................. JP2018-209273

(51) Int. Cl.
*H02M 3/158* (2006.01)
*H02J 3/38* (2006.01)
*H02M 1/08* (2006.01)

(52) U.S. Cl.
CPC ............... *H02J 3/385* (2013.01); *H02M 1/08* (2013.01); *H02M 3/1582* (2013.01)

(58) Field of Classification Search
CPC ........ H02J 3/385; H02M 1/08; H02M 3/1582; H02M 1/158
See application file for complete search history.

(56) References Cited

U.S. PATENT DOCUMENTS

2018/0309300 A1*    10/2018    Dai .......................... H02J 3/381

FOREIGN PATENT DOCUMENTS

| JP | 2016-110524 A | 6/2016 |
|----|---------------|--------|
| JP | 6215224 B2    | 10/2017 |
| WO | 2014/077355 A1 | 5/2014 |

\* cited by examiner

*Primary Examiner* — Robert L Deberadinis
(74) *Attorney, Agent, or Firm* — Chen Yoshimura LLP

(57) ABSTRACT

According to one embodiment, a power convertor includes a buck-boost circuit; a switch driver, a switching controller, and a positive input terminal and a negative input terminal. In maximum power-point tracking, the switching controller causes the buck-boost circuit to stop outputting the output voltage, and varies the voltage value of the input voltage in a given range, which is from a lower-limit voltage value at which the switch driver is operable, by switching between the positive input terminal and the negative input terminal while varying a duty factor.

13 Claims, 17 Drawing Sheets

FIG.23
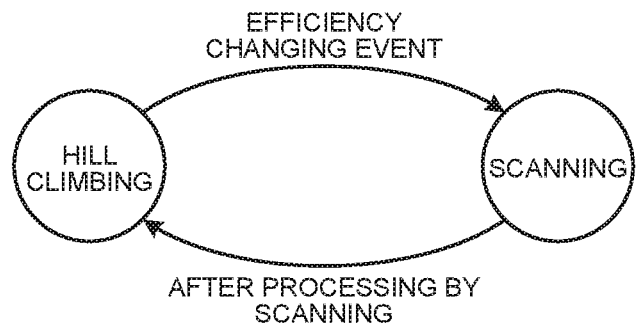
FIG.24
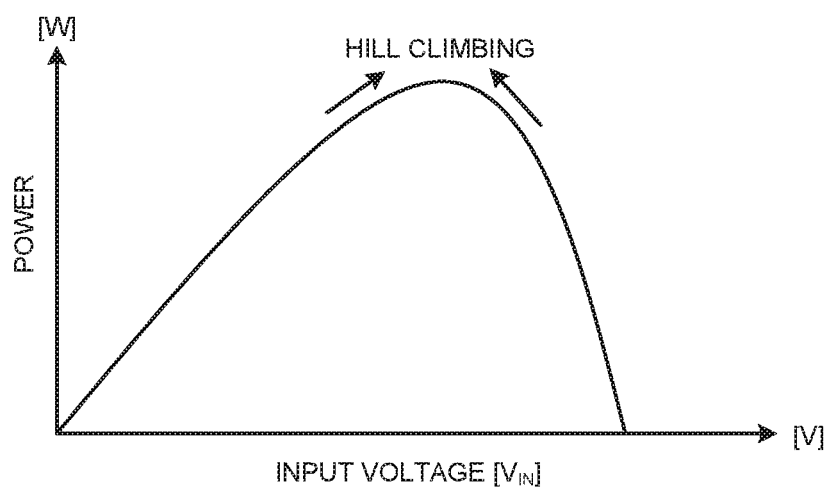
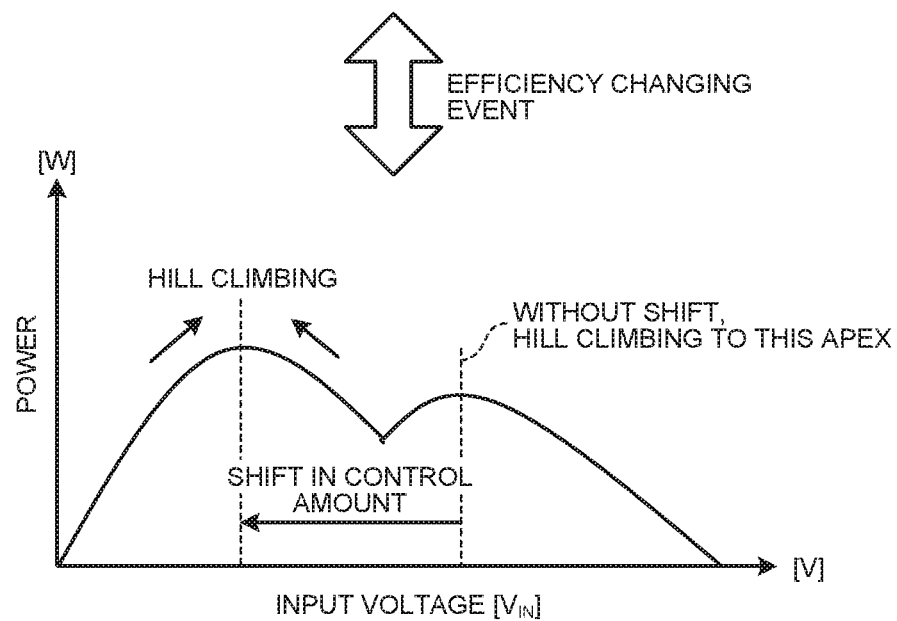

POWER CONVERTOR, POWER GENERATION SYSTEM, AND POWER GENERATION CONTROL METHOD

CROSS-REFERENCE TO RELATED APPLICATIONS

This application is based upon and claims the benefit of priority from Japanese Patent Application No. 2018-209273, filed on Nov. 6, 2018, the entire contents of which are incorporated herein by reference.

FIELD

Embodiments described herein relate generally to a power convertor, a power generation system, and a power generation control method.

BACKGROUND

Solar power generation systems including solar panels to generate power are known. Solar panels exhibit a peak point on a characteristic curve representing generated power with respect to generated voltage. Such a solar power generation system controls power conversion to operate the solar panels at a maximum power point. Such control is referred to as maximum power-point tracking (MPPT) control.

As a MPPT control method, a scanning method is known. By a scanning method, a power conversion device temporarily stops converting power, and varies the output voltage of a solar panel from a maximum value to a minimum value to determine a voltage value at which maximum power is generated. The power conversion device executes power conversion to the solar panel such that the solar panel outputs the voltage of the determined value.

In addition, attachment of power convertors to individual solar panels is a known method. In this method, the power convertors attached to the individual solar panels are driven by the power generated by the corresponding solar panels. Thereby, the power convertors can operate with no receipt of power from outside.

However, with the output voltage from the solar panel set to a minimum value (for example, zero) in order to execute MPPT control by scanning, such a power conversion device cannot receive power from the solar panel. That is, the power conversion device is caused to stop operating in the middle of varying the output voltage of the solar panel to the minimum value.

It is thus useful to provide a power converter, a power generation system, and a power generation control method which can reliably determine a maximum power point without stopping operation.

SUMMARY

A power convertor according to this disclosure includes a buck-boost circuit, a switch driver, a switching controller, and a positive input terminal and a negative input terminal. The buck-boost circuit is to be applied with an input voltage to convert the input voltage into an output voltage for output. The input voltage is generated by a power generation module that generates direct-current power. The switch driver is driven by the direct-current power generated by the power generation module, to switch the buck-boost circuit The switching controller executes maximum power-point tracking to control power conversion of the buck-boost circuit such that the power generation module generates maximum direct-current power. The positive input terminal and the negative input terminal are to be applied with the input voltage generated by the power generation module. As the maximum power-point tracking, the switching controller causes the buck-boost circuit to stop outputting the output voltage, and varies the voltage value of the input voltage in a given range by switching between the positive input terminal and the negative input terminal while varying a duty factor, the given range being from a lower-limit voltage value at which the switch driver is operable; specifies, from among voltage values of the input voltage in the given range, a voltage value at which the power generation module generates the maximum direct-current power; and controls the buck-boost circuit to convert power with an amount of control such that the input voltage turns to the specified voltage value.

BRIEF DESCRIPTION OF THE DRAWINGS

FIG. 23 is a state transition diagram of a switching controller according to the fourth embodiment; and FIG. 24 is a diagram illustrating an exemplary variation in a characteristic curve representing generated power with respect to generated voltage at the time of occurrence of an efficiency changing event.

DETAILED DESCRIPTION

Figure 1:
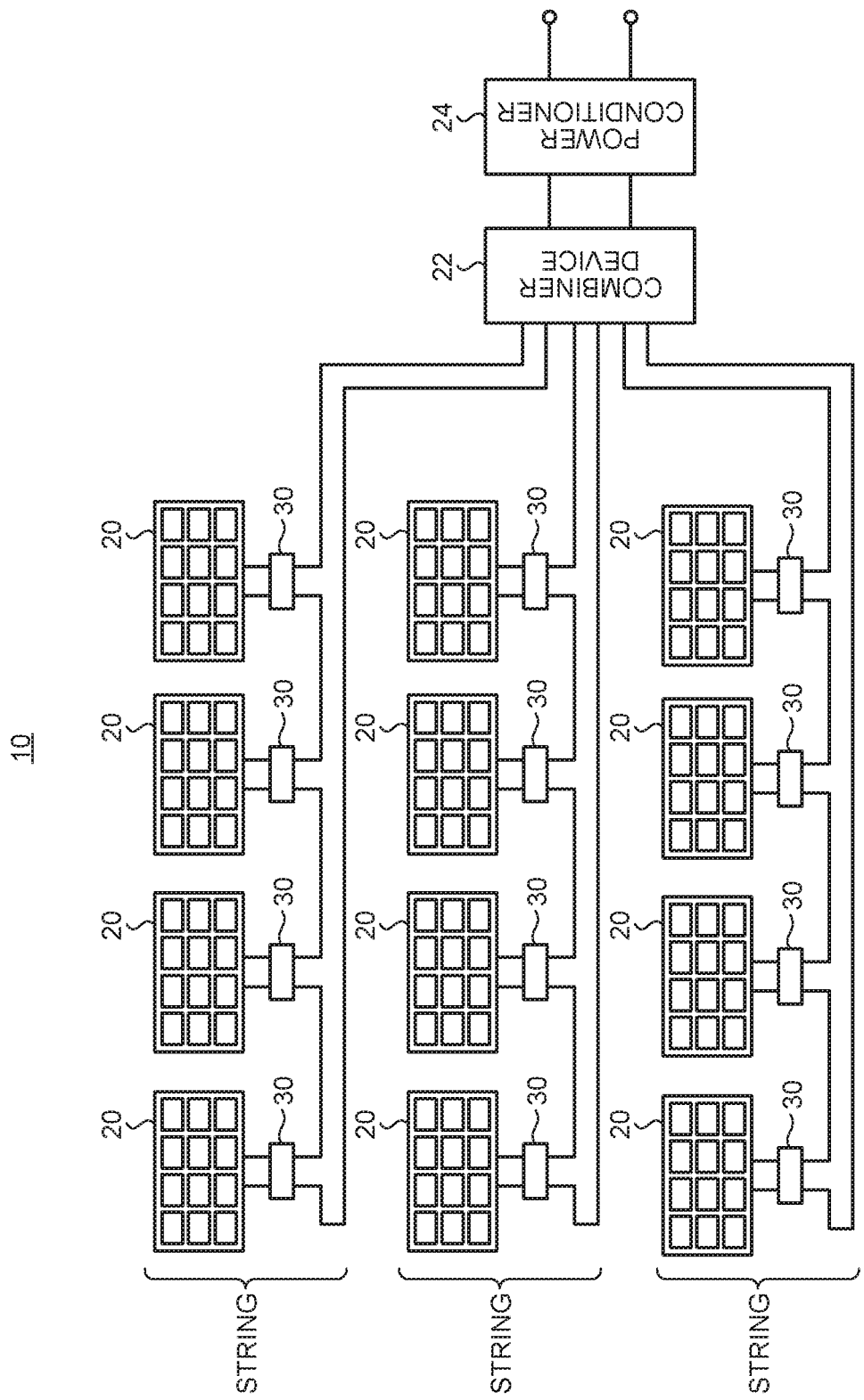
FIG. 1 is a diagram illustrating an exemplary configuration of a power generation system.

A plurality of embodiments will be described below. Elements common to the embodiments are denoted by the same reference numerals. Configurations or structures common to the embodiments are described in detail in a first embodiment, and detailed descriptions thereof are omitted in the subsequent embodiments except for differences.

First Embodiment

FIG. 1 is a diagram illustrating a power generation system 10 according to a first embodiment by way of example. The power generation system 10 includes a plurality of solar panels 20, a combiner device 22, a power conditioner 24, and one or two or more power convertors 30.

The solar panels 20 receive solar light, and convert the received solar light into electric energy. The solar panels 20 generate DC power.

The solar panels 20 each include a plurality of clusters. For example, each solar panel 20 includes two or three clusters. Each cluster includes a plurality of solar cells or power generation cells connected in series. The clusters of the solar panels 20 are connected in series. While all of the clusters of the individual solar panels 20 normally receive solar light to generate power, bypass diodes connected in parallel to all of the clusters are turned off, receiving no bypass current. As a result, as long as all of the clusters in the solar panel 20 normally receive solar light to generate power, the solar panel 20 generally generates power (in general efficiency state). If part of the clusters of the solar panel 20 is shadowed or fails to operate properly, however, the bypass diode parallel-connected to the partly shaded or faulty cluster is turned on, receiving a bypass current. That is, with part of the clusters shaded or having failed, the solar panel 20 generates power at lower efficiency than usual (in low efficiency state).

The power generation system 10 includes one or two or more strings. One string includes a plurality of solar panels 20. The solar panels 20 in one string are connected in series.

The combiner device 22 connects DC power output from the strings in parallel, and supplies the DC power to the power conditioner 24. The combiner device 22 prevents the current from reversely flowing from a string to another string. For prevention of the reverse flow, each string is connected forward to a diode at a terminal that generates a positive voltage.

The power conditioner 24 receives and converts DC power from the combiner device 22 into AC power with a given frequency. The power conditioner 24 outputs the generated AC power to outside through a power line. The power conditioner 24 serves to protect interconnected systems.

The power conditioner 24 executes maximum power-point tracking (MPPT) control over the entire solar panels 20. The solar panels 20 exhibit a peak point or a local maximum point on a characteristic curve representing generated power with respect to generated voltage. Through the maximum power-point tracking control, the power conditioner 24 allows the solar panels 20 to operate at the maximum operating point.

All or part of the solar panels 20 have power convertors 30 attached thereto. The power convertors 30 receive and convert DC power from the solar panels 20 into DC power (DC to DC conversion). The power convertors 30 of the solar panels 20 are connected in series at output end to another solar panel 20.

FIG. 1 illustrates an example that all of the solar panels 20 have the power convertors 30 attached thereto. However, the power generation system 10 may include solar panel or panels 20 with no power convertor 30 attached.

The power generation system 10 according to the first embodiment may include, instead of the solar panels 20, another power generation module that exhibits a peak point on the characteristic curve representing generated power with respect to generated voltage. For example, the power generation module may be a wind-power generator or fuel cells.

Figure 2:
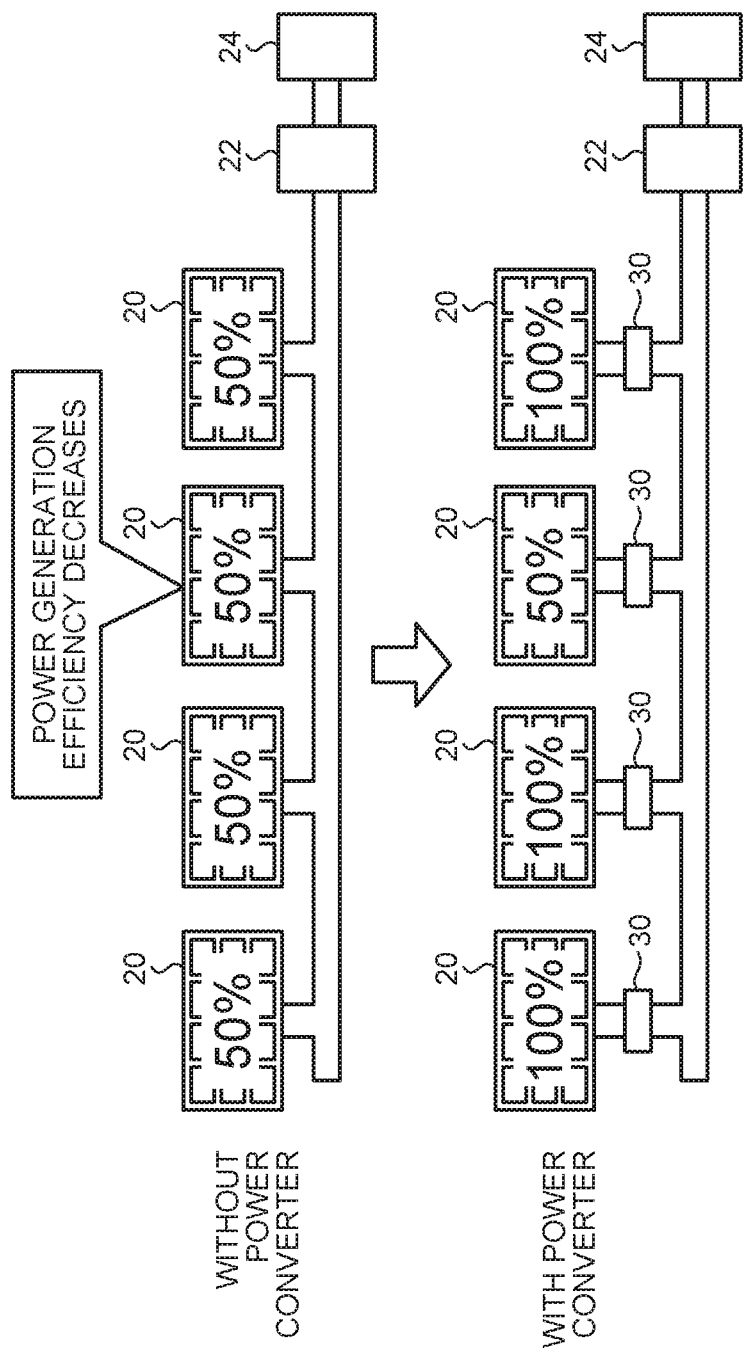
FIG. 2 is a diagram illustrating power generation efficiency with or without power convertors.

FIG. 2 is a diagram illustrating power generation efficiency with or without the power convertors 30. The power convertors 30 execute maximum power-point tracking control over the corresponding solar panels 20 for power conversion to operate them at a maximum power point.

For example, with no power convertors 30 attached to the solar panels 20, along with a decrease in power generation efficiency of one solar panel 20, the other solar panels 20 of the same string will decrease in power generation efficiency.

However, in the case of the solar panel 20 with the power convertor 30, the power convertor 30 can step up or down voltage generated by the corresponding solar panel 20 to supply the voltage to the string to operate the corresponding solar panel 20 at a maximum power point, irrespective of a decrease in power generation efficiency of the solar panel 20. Thus, the other solar panels 20 in the same string can also operate at the maximum power point. That is, irrespective of a decrease in power generation efficiency of the corresponding solar panel 20, the power convertor 30 can minimize the decrease in power generation efficiency of the other solar panels 20 of the string.

Figure 3:
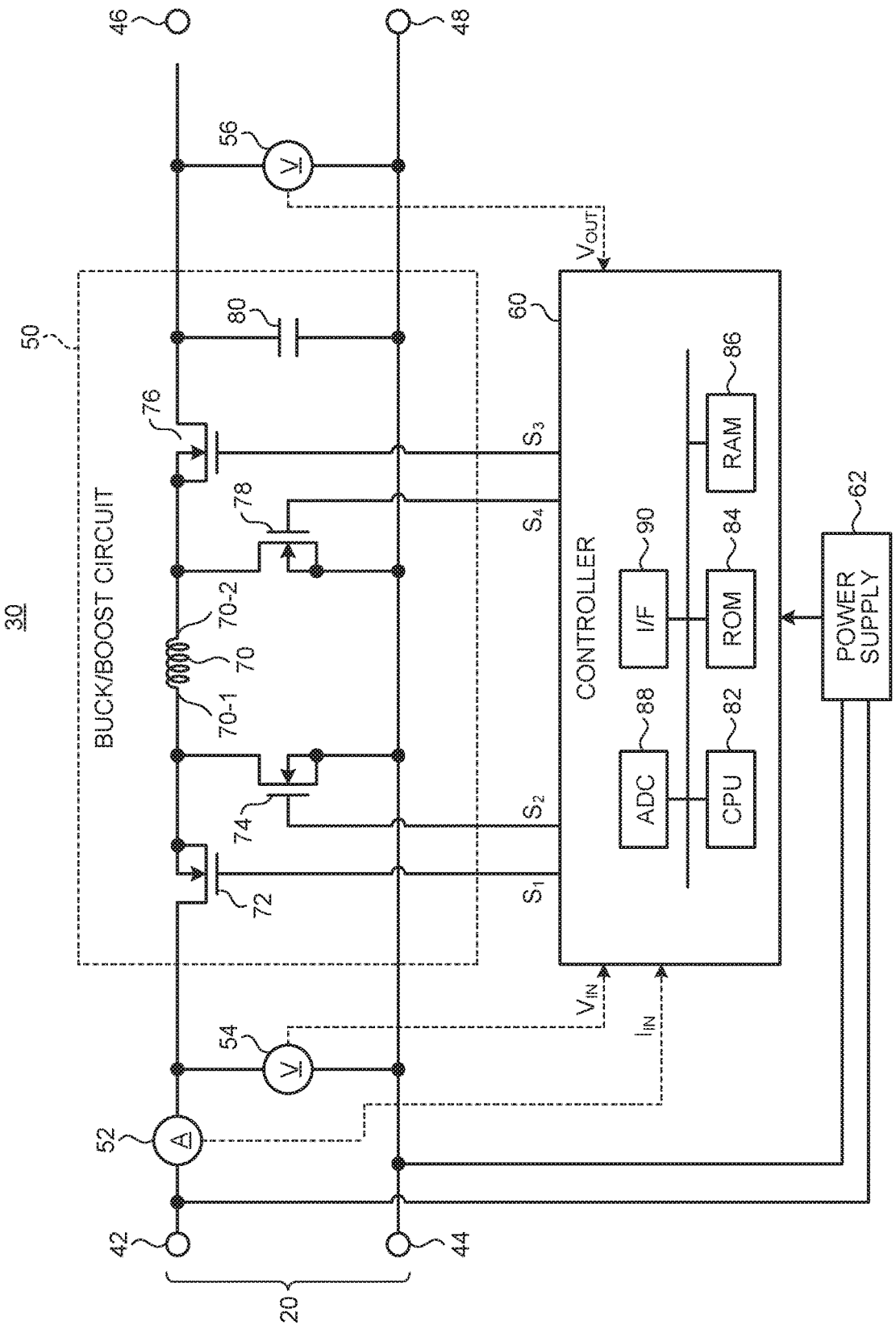
FIG. 3 is a diagram illustrating an exemplary configuration of the power convertor.

FIG. 3 is a diagram illustrating an exemplary configuration of the power convertor 30. The power convertor 30 includes a positive input terminal 42, a negative input terminal 44, a positive output terminal 46, a negative output terminal 48, a buck-boost circuit 50, an ammeter 52, an input-side voltmeter 54, an output-side voltmeter 56, a controller 60, and a power supply 62.

The positive input terminal 42 and the negative input terminal 44 are applied with an input voltage generated from the corresponding solar panel 20. The positive input terminal 42 is connected to a positive terminal of the corresponding solar panel 20. The negative input terminal 44 is connected to a negative terminal of the corresponding solar panel 20.

The positive output terminal 46 is connected to a negative terminal of another solar panel 20 adjacent to the positive side in the same string or the negative output terminal 48 of the power convertor 30 of another adjacent solar panel 20. The positive output terminal 46 of the solar panel 20 located at the positive-side end of the string is connected to the combiner device 22.

The negative output terminal 48 is connected to a positive terminal of another solar panel 20 adjacent to the negative side in the same string or the positive output terminal 46 of the power convertor 30 of another solar panel 20 adjacent to the negative side. The negative output terminal 48 of the solar panel 20 located at the negative-side end of the string is connected to the combiner device 22.

The ammeter 52 measures a value of current (input current $I_{IN}$) from the corresponding solar panel 20. In the present embodiment, the ammeter 52 measures current flowing from the positive input terminal 42 to the positive output terminal 46. For example, the ammeter 52 includes a current-measurement resistor with a minute resistance value, inserted in a path between the positive input terminal 42 and the positive output terminal 46, and an amplifier for amplifying a voltage generated in the current measurement resistor. Such an ammeter 52 outputs to the controller 60 voltage of a value proportional to the current (input current $I_{IN}$) from the corresponding solar panel 20.

The input-side voltmeter 54 measures a value of voltage (input voltage $V_{IN}$) generated from the corresponding solar panel 20. In the present embodiment, the input-side voltmeter 54 measures a voltage in-between the positive input terminal 42 and the negative input terminal 44. For example, the input-side voltmeter 54 includes an input-voltage detection resistor with a large resistance value, located between the positive input terminal 42 and the negative input terminal 44, and an amplifier for amplifying a voltage generated in the input-voltage detection resistor. Such an input-side voltmeter 54 outputs to the controller 60 voltage of a value proportional to the voltage (input voltage $V_{IN}$) generated from the corresponding solar panel 20.

The output-side voltmeter 56 measures a value of a voltage (output voltage $V_{OUT}$) output from the buck-boost circuit 50. In the present embodiment, the output-side voltmeter 56 measures a voltage in-between the positive output terminal 46 and the negative output terminal 48. For example, the output-side voltmeter 56 includes an output-voltage detection resistor with a large resistance value, located between the positive output terminal 46 and the negative output terminal 48, and an amplifier for amplifying a voltage generated in the output voltage detection resistor. Such an output-side voltmeter 56 outputs to the controller 60*a* voltage of a value proportional to the voltage (output voltage $V_{OUT}$) from the buck-boost circuit 50.

The buck-boost circuit 50 is applied with an input voltage $V_{IN}$ of DC power generated from the corresponding solar panel 20. The buck-boost circuit 50 outputs the output voltage $V_{OUT}$ of DC power power-converted from the input voltage $V_{IN}$. The buck-boost circuit 50 represents an H-bridge chopper circuit. The buck-boost circuit 50 can step down the input voltage $V_{IN}$ to an output voltage $V_{OUT}$ ($V_{IN}>V_{OUT}$), and step up the input voltage $V_{IN}$ ($V_{IN}<V_{OUT}$) to an output voltage $V_{OUT}$ for output. The buck-boost circuit 50 can directly output the input voltage $V_{IN}$ as the output voltage $V_{OUT}$ without power conversion ($V_{IN}=V_{OUT}$).

In the present embodiment, the buck-boost circuit 50 includes an inductor 70, a first switch 72, a second switch 74, a third switch 76, a fourth switch 78, and a capacitor 80.

The first switch 72 switches on and off a path between the positive input terminal 42 and a first terminal 70-1 of the inductor 70 under the control of the controller 60. The second switch 74 switches on and off a path between the negative input terminal 44 and the first terminal 70-1 of the inductor 70 under the control of the controller 60. The third switch 76 switches on and off a path between a second terminal 70-2 of the inductor 70 and the positive output terminal 46 under the control of the controller 60. The fourth switch 78 switches on and off a path between the second terminal 70-2 of the inductor 70 and the negative output terminal 48 under the control of the controller 60. The capacitor 80 is connected in-between the positive output terminal 46 and the negative output terminal 48.

The first switch 72 represents, for example, an n-channel metal oxide semiconductor field effect transistor (MOSFET). The first switch 72 has a drain connected to the positive input terminal 42, a source connected to the first terminal 70-1 of the inductor 70, and a gate supplied with a first switching signal $S_1$ from the controller 60.

The second switch 74 represents, for example, an n-channel MOSFET. The second switch 74 has a drain connected to the first terminal 70-1 of the inductor 70, a source connected to the negative input terminal 44, and a gate supplied with a second switching signal $S_2$ from the controller 60.

The third switch 76 represents, for example, an n-channel MOSFET. The third switch 76 has a source connected to the second terminal 70-2 of the inductor 70, a drain connected to the positive output terminal 46, and a gate supplied with a third switching signal $S_3$ from the controller 60.

The fourth switch 78 represents, for example, an n-channel MOSFET. The fourth switch 78 has a drain connected to the second terminal 70-2 of the inductor 70, a source connected to the negative output terminal 48, and a gate supplied with a fourth switching signal $S_4$ from the controller 60.

The controller 60 represents a microcomputer, and controls the operation of the buck-boost circuit 50. The power supply 62 receives DC power from the corresponding solar panel 20 through the positive input terminal 42 and the negative input terminal 44, and stabilizes a DC voltage for output. The power supply 62 applies the stabilized DC voltage to the controller 60. Thus, the controller 60 is driven by the DC power generated by the corresponding solar panel 20.

In the present embodiment, the controller 60 includes a central processing unit (CPU) 82, a read only memory (ROM) 84, a random access memory (RAM) 86, an analog-to-digital converter (ADC) 88, and an I/F circuit 90. These elements are connected via a bus.

The CPU 82 executes various kinds of processing in coordination with various kinds of computer programs pre-stored in the ROM 84, using a given area of the RAM 86 as a work area, and comprehensively controls the operations of the elements of the controller 60. The CPU 82 operates the ADC 88 and the I/F circuit 90 in coordination with computer programs pre-stored in the ROM 84.

The ROM 84 stores in a non-rewritable manner computer programs and various kinds of setup information used in the control by the controller 60. The RAM 86 represents a volatile storage medium, such as a dynamic random access memory (DRAM). The RAM 86 functions as a work area for the CPU 82.

The ADC 88 converts voltages output from the ammeter 52, the input-side voltmeter 54, and the output-side voltmeter 56 into digital values. Thereby, the CPU 82 can acquire the value of the input current $I_{IN}$, the value of the input voltage $V_{IN}$, and the value of the output voltage $V_{OUT}$.

The I/F circuit 90 outputs the first switching signal $S_1$, the second switching signal $S_2$, the third switching signal $S_3$, and the fourth switching signal $S_4$ under the control of the CPU 82. Thereby, the buck-boost circuit 50 can operate under the control of the controller 60.

Figure 4:
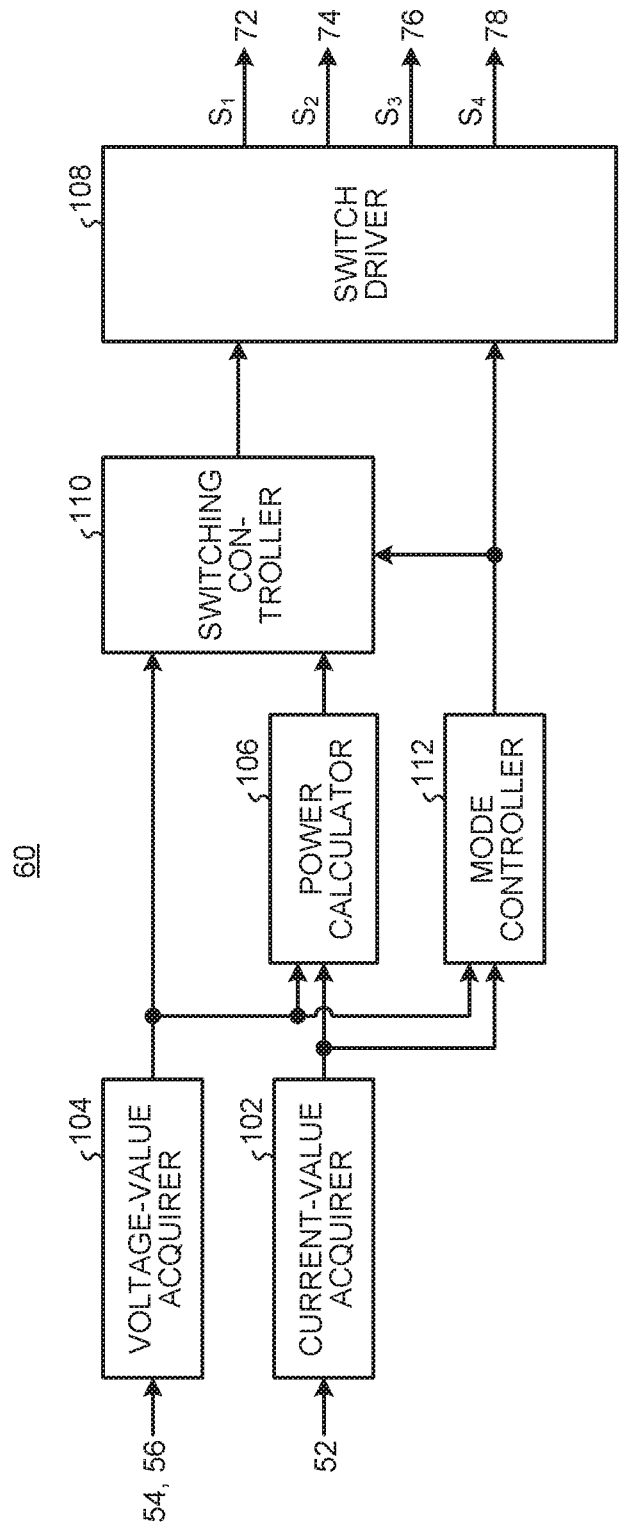
FIG. 4 is a diagram illustrating an exemplary functional configuration of a controller according to a first embodiment.

FIG. 4 is a diagram illustrating an exemplary functional configuration of the controller 60 according to the first embodiment. The controller 60 functions as the elements illustrated in FIG. 4 by a computer program stored in the ROM 84 and executed by the CPU 82.

Specifically, the controller 60 includes a current-value acquirer 102, a voltage-value acquirer 104, a power calculator 106, a switch driver 108, a switching controller 110, and a mode controller 112.

The current-value acquirer 102 acquires a value of the input current $I_{IN}$ from the corresponding solar panel 20, the value measured by the ammeter 52. The voltage-value acquirer 104 acquires a value of the input voltage $V_{IN}$ generated from the corresponding solar panel 20 and measured by the input-side voltmeter 54. The voltage-value acquirer 104 further acquires a value of the output voltage $V_{OUT}$ from the buck-boost circuit 50, the value measured by the output-side voltmeter 56. The current-value acquirer 102 and the voltage-value acquirer 104 are implemented by the ADC 88 and the CPU 82.

The power calculator 106 calculates DC power generated by the corresponding solar panel 20 from the value of the input voltage $V_{IN}$ and the value of the input current $I_N$. The power calculator 106 is implemented by the CPU 82.

The switch driver 108 outputs the first switching signal $S_1$, the second switching signal $S_2$, the third switching signal $S_3$, and the fourth switching signal $S_4$ to drive the first switch 72, the second switch 74, the third switch 76, and the fourth switch 78, respectively. The switch driver 108 is implemented by the I/F circuit 90 and the CPU 82.

In response to a command for designating the operation mode from the mode controller 112, the switch driver 108 turns on or off the first switch 72, the second switch 74, the third switch 76, and the fourth switch 78.

In response to receipt of a tracking mode command for the operation mode, the switch driver 108 performs switching of the first switch 72, the second switch 74, the third switch 76, and the fourth switch 78 under the control of the switching controller 110. Thereby, in response to receipt of a tracking mode command for the operation mode, the switch driver 108 can step down or up the input voltage $V_{IN}$ to output an output voltage $V_{OUT}$ to the buck-boost circuit 50.

In response to receipt of a stop mode command for the operation mode, the switch driver 108 turns off the first switch 72, the second switch 74, the third switch 76, and the fourth switch 78. Thus, in response to receipt of the stop mode command for the operation mode, the switch driver 108 can open the path between the positive output terminal 46 and the negative output terminal 48 to allow the buck-boost circuit 50 to stop outputting the output voltage $V_{OUT}$.

In response to receipt of a pass-through mode command for the operation mode, the switch driver 108 turns on the first switch 72 and the third switch 76 and turns off the second switch 74 and the fourth switch 78. That is, in response to receipt of the pass-through mode for the operation mode, the switch driver 108 can connect in-between the positive input terminal 42 and the positive output terminal 46 in a DC manner and connect between the negative input terminal 44 and the negative output terminal 48 in a DC manner to allow the buck-boost circuit 50 to output the input voltage $V_{IN}$ directly as the output voltage $V_{OUT}$ without power conversion.

The switching controller 110 executes maximum power-point tracking to control the power conversion of the buck-boost circuit 50 such that the corresponding solar panel 20 generates maximum DC power. The switching controller 110 is implemented by the CPU 82.

In the maximum power-point tracking, the switching controller 110 acquires a target conversion ratio representing a target ratio of a value of the output voltage $V_{OUT}$ to a value of the input voltage $V_{IN}$. The switching controller 110 controls the switching of the first switch 72, the second switch 74, the third switch 76, and the fourth switch 78 such that the ratio between the value of the input voltage $V_{IN}$ and the value of the output voltage $V_{OUT}$ turns to the target conversion ratio.

In the maximum power-point tracking, the switching controller 110 causes the buck-boost circuit 50 to switch between a step-down operation and a step-up operation in accordance with the target conversion ratio. The target conversion ratio is expressed in percentage, for example. In this case, the switching controller 110 controls the buck-boost circuit 50 to perform the step-down operation when the target conversion ratio is smaller than 100%, and controls the buck-boost circuit 50 to perform the step-up operation when the target conversion ratio exceeds 100%.

The switching controller 110 executes hill climbing as an example of the maximum power-point tracking. For another example, the switching controller 110 may execute scanning as the maximum power-point tracking.

The mode controller 112 controls the operation mode of the power convertor 30 in accordance with the input voltage $V_{IN}$ and the input current $I_{IN}$. The mode controller 112 is implemented by the CPU 82.

More specifically, with the input current $I_{IN}$ from the corresponding solar panel 20 exceeding a preset current threshold $I_T$, the mode controller 112 sets the operation mode of the power convertor 30 to a tracking mode. In the tracking mode, the mode controller 112 controls the switching controller 110 to execute maximum power-point tracking.

With the input current $I_{IN}$ being the current threshold $I_T$ or less, the mode controller 112 sets the operation mode of the power convertor 30 to a pass-through mode. In the pass-through mode, the mode controller 112 controls the switching controller 110 to stop the maximum power-point tracking. In the pass-through mode, the mode controller 112 instructs the switch driver 108 to control the buck-boost circuit 50 to output the input voltage $V_{IN}$ directly as the output voltage $V_{OUT}$ without power conversion.

When the input voltage $V_{IN}$ is equal to or less than a preset voltage threshold $V_T$, the mode controller 112 sets the operation mode of the power convertor 30 to a stop mode irrespective of the input current $I_{IN}$. In the stop mode, the mode controller 112 controls the switching controller 110 to stop the maximum power-point tracking. In the stop mode, the mode controller 112 instructs the switch driver 108 to control the buck-boost circuit 50 to stop outputting the output voltage $V_{OUT}$.

Figure 5:
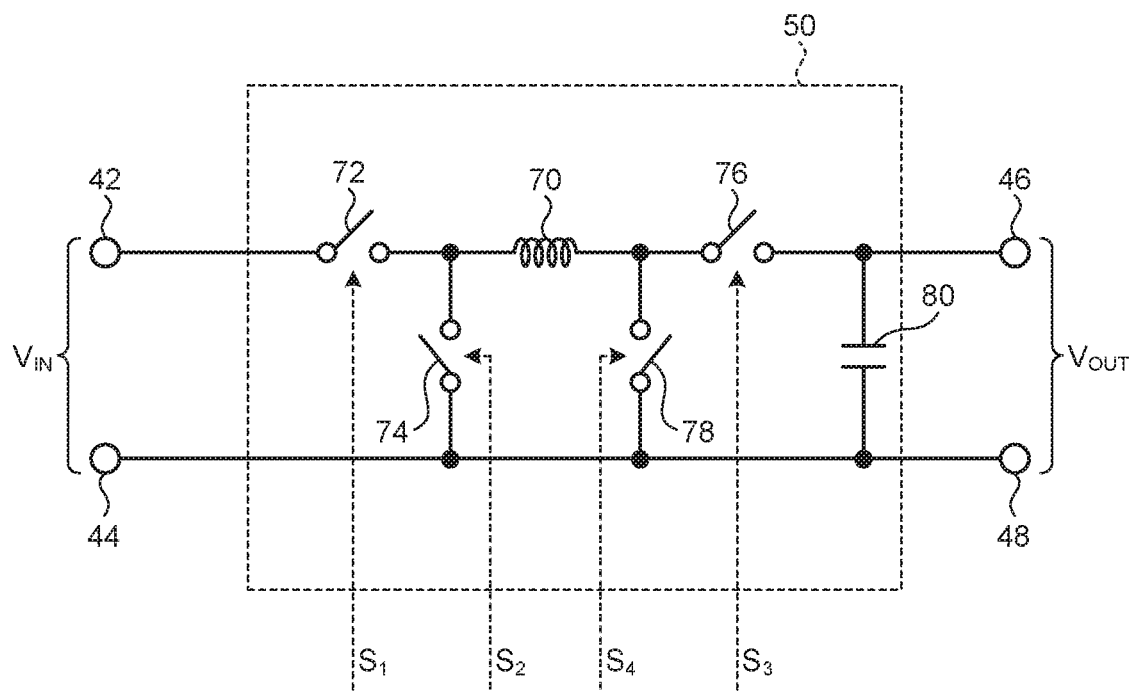
FIG. 5 is a diagram illustrating the states of switches of a buck-boost circuit in a stop mode.

FIG. 5 is a diagram illustrating the states of the switches of the buck-boost circuit 50 in the stop mode. In response to the stop mode command from the mode controller 112 as the operation mode, the switch driver 108 turns off the first switch 72, turns off the second switch 74, turns off the third switch 76, and turns off the fourth switch 78.

Thereby, in the stop mode, the switch driver 108 can open the path between the positive output terminal 46 and the negative output terminal 48. In the stop mode, the switch driver 108 can open the path between the corresponding solar panel 20 and the inductor 70. In this manner, the switch driver 108 can allow the buck-boost circuit 50 to stop the power conversion, and prevent the buck-boost circuit 50 from outputting the output voltage $V_{OUT}$.

Figure 6:
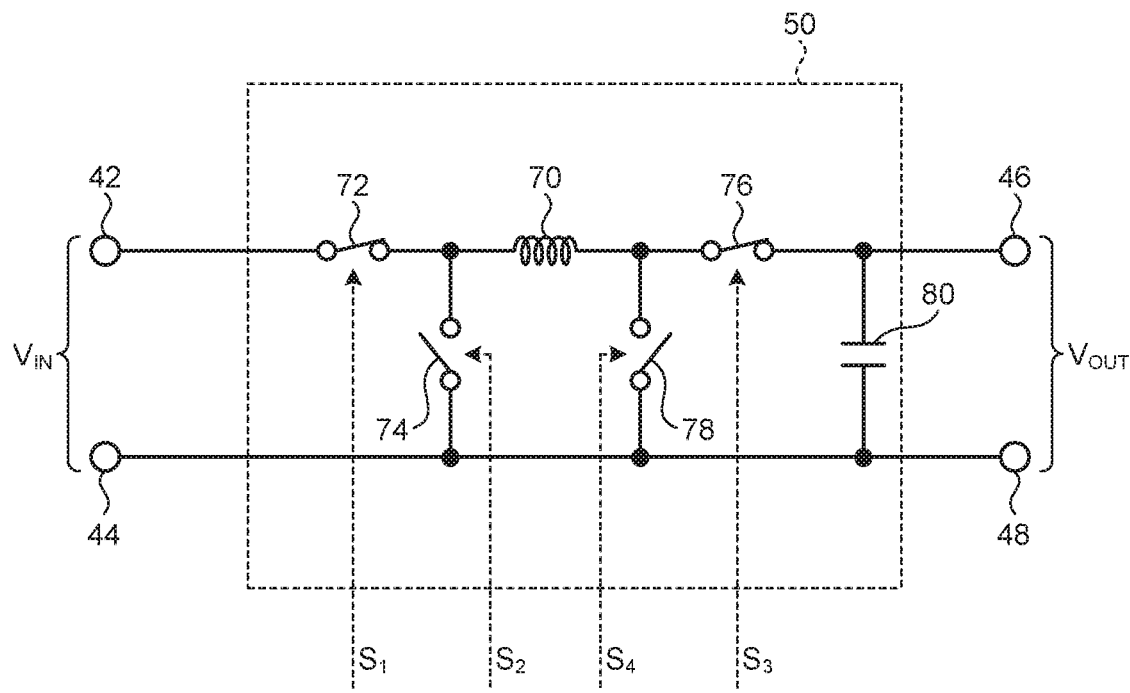
FIG. 6 is a diagram illustrating the states of the switches in the buck-boost circuit in a pass-through mode.

FIG. 6 is a diagram illustrating the states of the switches of the buck-boost circuit 50 in the pass-through mode. In response to a pass-through mode command from the mode controller 112 as the operation mode, the switch driver 108 turns on the first switch 72, turns off the second switch 74, turns on the third switch 76, and turns off the fourth switch 78.

The inductor 70 is equivalent to wiring having a resistance value of zero in terms of direct current. Thus, in the pass-through mode, the switch driver 108 can connect in-between the positive input terminal 42 and the positive output terminal 46, and connect in-between the negative input terminal 44 and the negative output terminal 48. Thereby, in the pass-through mode, the switch driver 108 can control the buck-boost circuit 50 to output the input voltage $V_{IN}$ directly as the output voltage $V_{OUT}$ without power conversion.

Figure 7:
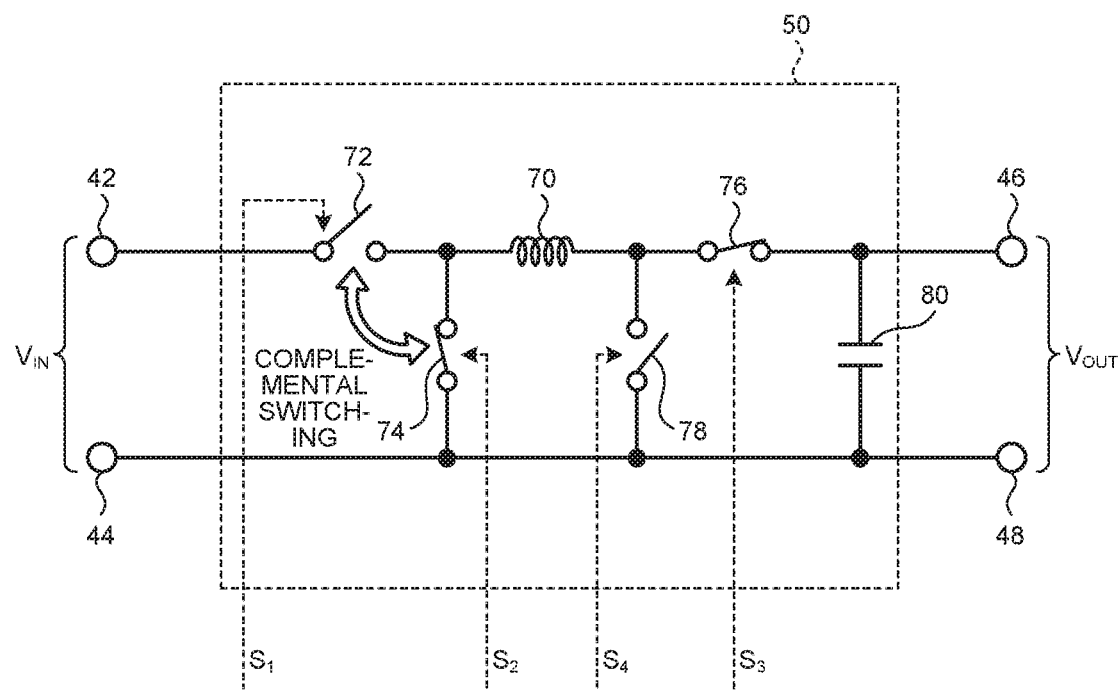
FIG. 7 is a diagram illustrating the states of the switches in the buck-boost circuit during voltage step-down in a tracking mode.

FIG. 7 is a diagram illustrating the states of the switches of the buck-boost circuit 50 during voltage step-down in the tracking mode.

In the tracking mode, the switching controller 110 changes the switching method of the buck-boost circuit 50 during voltage step-down when the target conversion ratio is smaller than 100% and during voltage step-up when the target conversion ratio is larger than 100%.

During the voltage step-down in the tracking mode, the switching controller 110 performs switching as illustrated in FIG. 7. Specifically, the switching controller 110 fixedly turns on the third switch 76 and off the fourth switch 78. The switching controller 110 complementally switches on and off the first switch 72 and the second switch 74 in a given switching cycle. Complementally switching on and off the first switch 72 and the second switch 74 refers to turning off the second switch 74 while the first switch 72 is ON, and turning on the second switch 74 while the first switch 72 is OFF.

Figure 8:
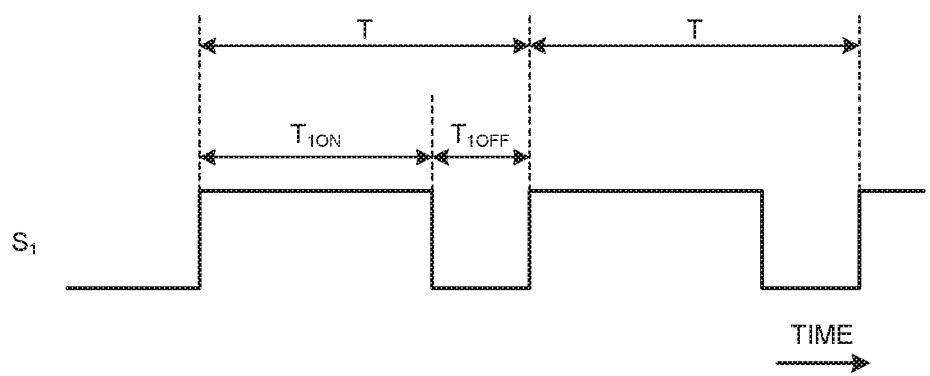
FIG. 8 is a diagram illustrating a waveform of a first switching signal during voltage step-down in the tracking mode.

FIG. 8 is a diagram illustrating the first switching signal $S_1$ during voltage step-down in the tracking mode. During the voltage step-down in the tracking mode at the target conversion ratio being less than 100%, the switching controller 110 sets an on-period of the first switch 72 such that the larger the target conversion ratio is, the longer the on-period is.

At the target conversion ratio being less than 100%, for example, the switching controller 110 complementally switches on and off the first switch 72 and the second switch 74 such that the on-period of the first switch 72 with respect to the switching cycle is set to a proportion corresponding to the target conversion ratio. More specifically, the switching controller 110 sets the on-period $T_{1ON}$ and the off period $T_{1OFF}$ of the first switch 72 to the values defined by the following equations:

$T_{1ON}=T \times R/100$ $T_{1OFF}=T-T_{1ON}$ where T represents the given switching cycle and R represents the target conversion ratio expressed in percentage.

In this manner, during the voltage step-down, the switching controller 110 can control the buck-boost circuit 50 to output an output voltage $V_{OUT}$ of a value obtained by multiplying the value of the input voltage $V_{IN}$ by the target conversion ratio.

Figure 9:
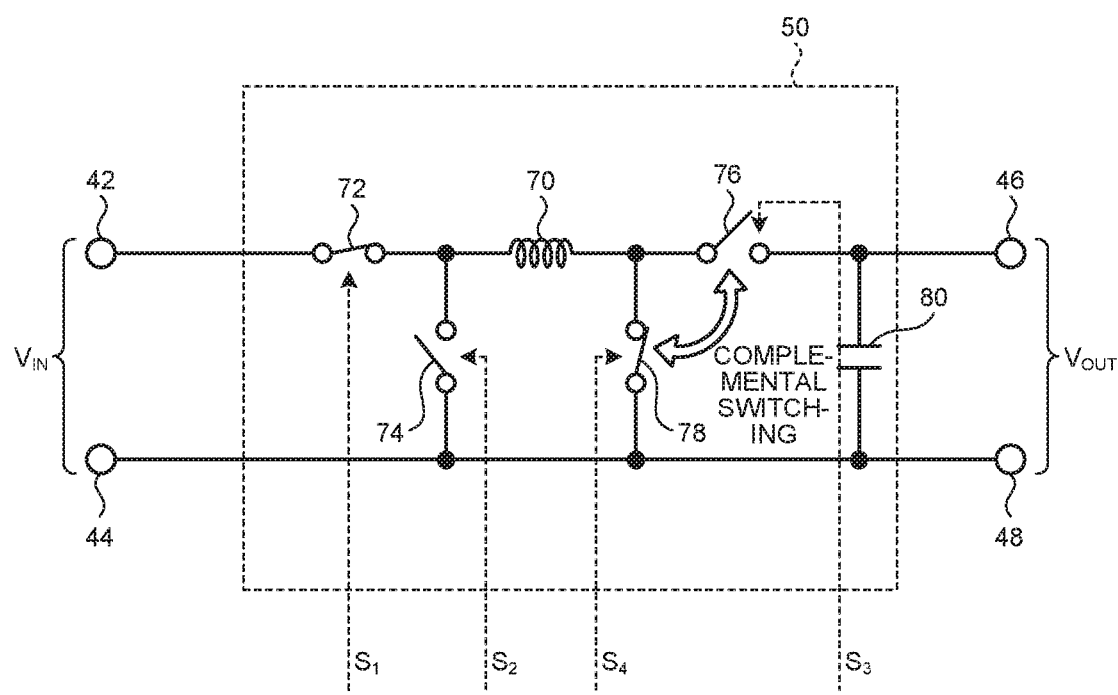
FIG. 9 is a diagram illustrating the states of the switches in the buck-boost circuit during voltage step-up in the tracking mode.

FIG. 9 is a diagram illustrating the states of the switches of the buck-boost circuit 50 during voltage step-up. During voltage step-up in the tracking mode, the switching controller 110 performs switching as illustrated in FIG. 9.

Specifically, the switching controller 110 fixedly turns on the first switch 72 and off the second switch 74. The switching controller 110 complementally switches on and off the third switch 76 and the fourth switch 78 in a given switching cycle. Complementally switching on and off the third switch 76 and the fourth switch 78 refers to turning off the fourth switch 78 while the third switch 76 is ON, and turning on the fourth switch 78 while the third switch 76 is OFF.

Figure 10:
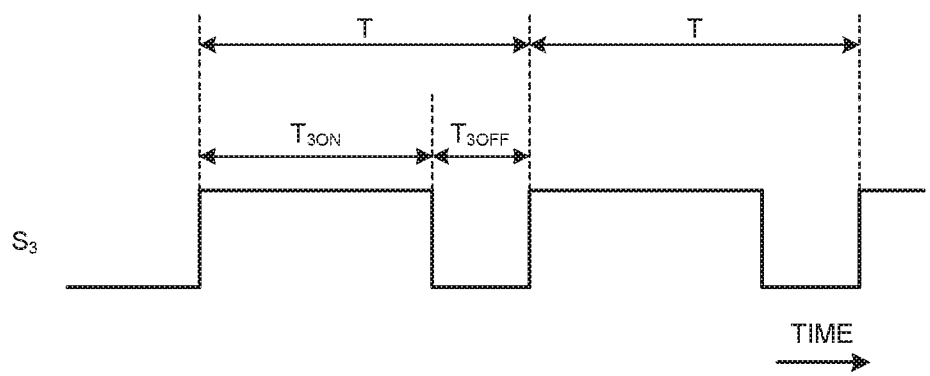
FIG. 10 is a diagram illustrating a waveform of a third switching signal during voltage step-up in the tracking mode.

FIG. 10 is a diagram illustrating the third switching signal $S_3$ during voltage step-up. During the voltage step-up in the tracking mode at the target conversion ratio exceeding 100%, the switching controller 110 sets the on-period of the third switch 76 such that the larger the target conversion ratio is, the longer as the on-period is.

At the target conversion ratio exceeding 100%, for example, the switching controller 110 complementally switches one and off the third switch 76 and the fourth switch 78 such that the on-period of the third switch 76 with respect to the switching cycle is set to a proportion corresponding to a value found by dividing, by the target conversion ratio, a value being a resultant of subtracting 100% from the target conversion ratio. More specifically, for example, the switching controller 110 sets the on-period $T_{3ON}$ and the off period $T_{3OFF}$ of the third switch 76 to the values defined by the following equations:

$T_{3ON}=T \times (R-100)/R$ $T_{3OFF}=T-T_{3ON}$ where T represents the given switching cycle and R represents the target conversion ratio expressed in percentage.

In this manner, during voltage step-up, the switching controller 110 can control the buck-boost circuit 50 to output the output voltage $V_{OUT}$ of a value obtained by multiplying the value of the input voltage $V_{IN}$ by the target conversion ratio.

Figure 11:
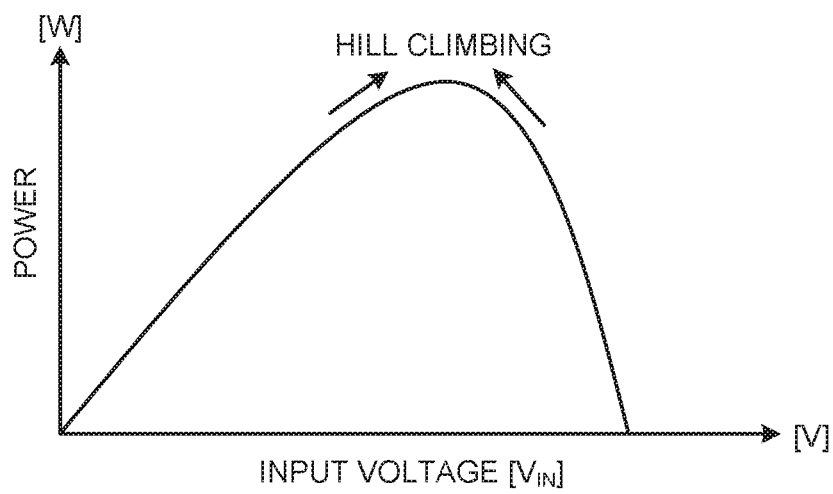
FIG. 11 is a diagram for illustrating a variation in input voltage by hill climbing.

FIG. 11 illustrates variation in the input voltage $V_{IN}$ in hill climbing. The hill climbing refers to a maximum power-point tracking control method for the buck-boost circuit 50 while continuously performing power conversion, i.e., without suspending power conversion.

By hill climbing, the switching controller 110 minutely increases or decreases the target conversion ratio while allowing the buck-boost circuit 50 to continue power conversion. The switching controller 110 monitors a variation in power generated by the solar panel 20 to change the target conversion ratio such that the solar panel 20 generates increased power. As a result, the switching controller 110 can increase or decrease the target conversion ratio such that the value of the input voltage $V_{IN}$ reciprocates across a peak power point. Thereby, the switching controller 110 can operate the corresponding solar panel 20 at a maximum power point.

Figure 12:
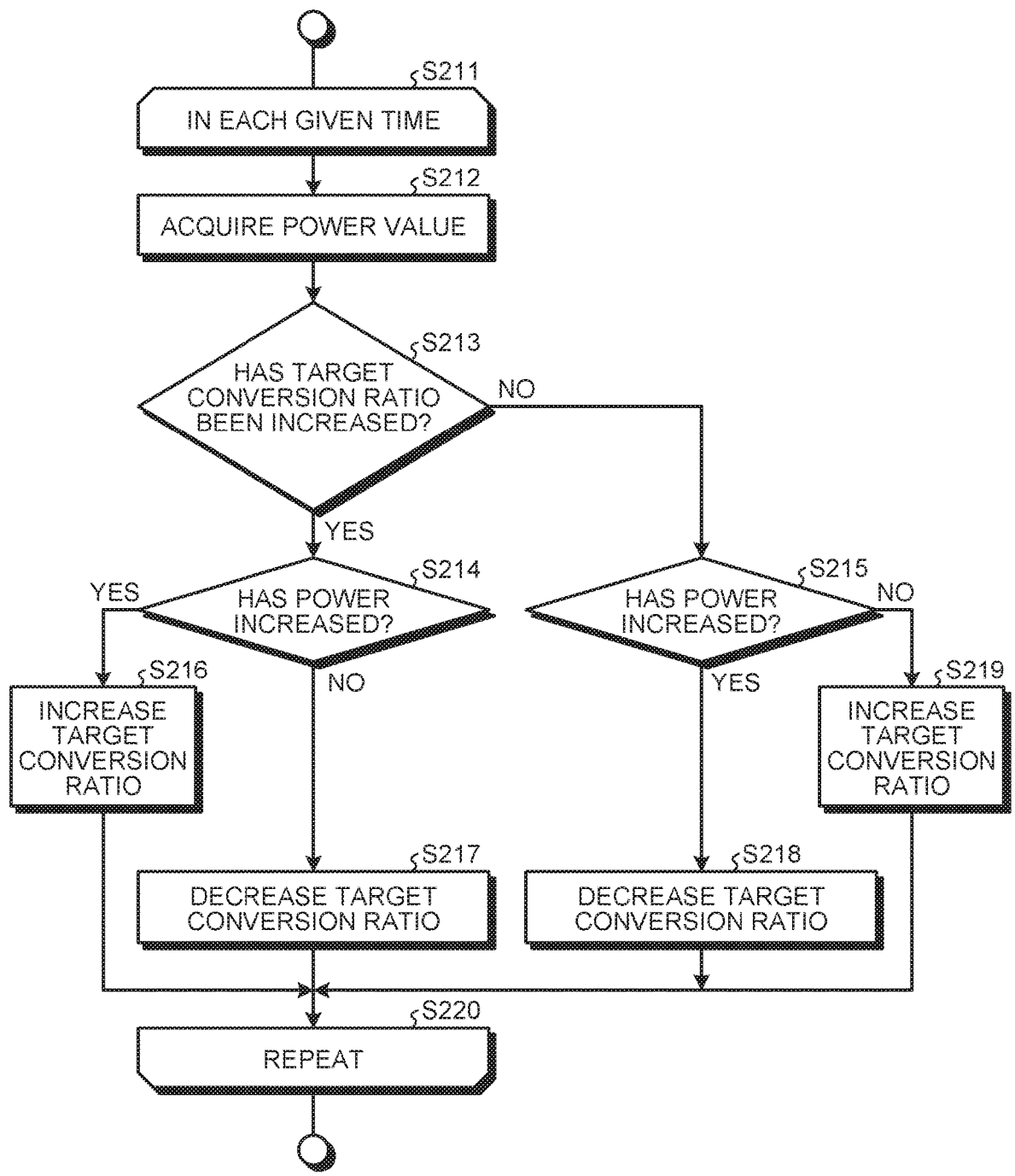
FIG. 12 is a flowchart of processing by the hill climbing.

FIG. 12 is a flowchart illustrating the procedure of the hill climbing. For example, the switching controller 110 executes the processing for the hill climbing, as illustrated in FIG. 12.

The switching controller 110 repeats the processing from S212 to S219, i.e., loop operation between S211 and S220) in each given time. At S212, the switching controller 110 acquires a value of DC power generated by the corresponding solar panel 20.

Subsequently, at S213, the switching controller 110 determines whether the target conversion ratio has been increased in the previous loop operation. With an increase in the target conversion ratio (Yes at S213), the switching controller 110 proceeds to S214. With no increase in the target conversion ratio, that is, decrease in the target conversion ratio (No at S213), the switching controller 110 proceeds to S215.

At S214, the switching controller 110 compares a value of DC power calculated in the previous loop operation with a value of DC power calculated in the current loop operation. With an increase in the power (Yes at S214), the switching controller 110 proceeds to S216. With no increase in the power (No at S214), the switching controller 110 proceeds to S217.

At S216, the switching controller 110 increases the target conversion ratio by a given amount. At S217, the switching controller 110 decreases the target conversion ratio by a given amount.

At S215, the switching controller 110 compares a value of DC power calculated in the previous loop operation with a value of DC power calculated in the current loop operation. With an increase in the power (Yes at S215), the switching controller 110 proceeds to S218. With no increase in the power (No at S215), the switching controller 110 proceeds to S219.

At S218, the switching controller 110 decreases the target conversion ratio by a given amount. At S219, the switching controller 110 increases the target conversion ratio by a given amount.

After completing the processing at S216, S217, S218, or S219, the switching controller 110 repeats the processing from S212, i.e., loop operation between S211 and S220 after a given length of time.

As described above, if the DC power has increased by increasing the target conversion ratio, the switching controller 110 further increases the target conversion ratio, and if the DC power has decreased by increasing the target conversion ratio, the switching controller 110 decreases the target conversion ratio. If the DC power has increased by decreasing the target conversion ratio, the switching controller 110 further decreases the target conversion ratio, and if the DC power has decreased by further decreasing the target conversion ratio, the switching controller 110 increases the target conversion ratio.

The switching controller 110 repeats such processing in each given time. Thereby, the switching controller 110 can operate the solar panel 20 at a maximum power point.

Figure 13:
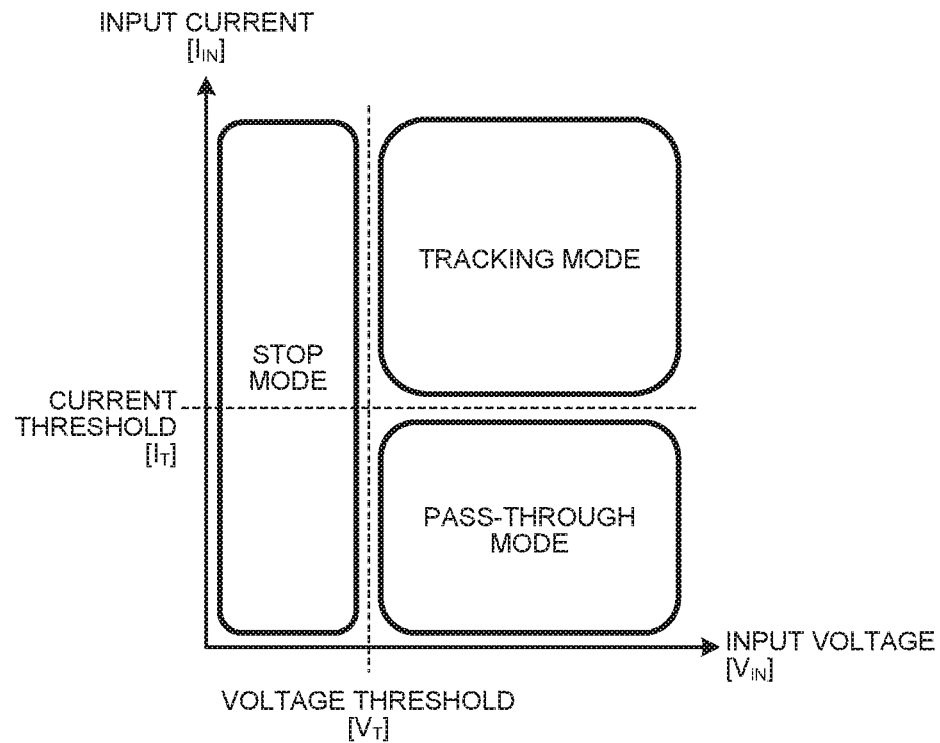
FIG. 13 is a diagram illustrating operation modes of the power convertor according to the first embodiment.

FIG. 13 is a diagram illustrating the operation modes of the power convertor 30 according to the first embodiment. The power convertor 30 according to the first embodiment operates in three operation modes: a stop mode, a tracking mode, and a pass-through mode.

The mode controller 112 is provided with a preset current threshold $I_T$ and a preset voltage threshold $V_T$. The mode controller 112 compares an input current $I_{IN}$ and an input voltage $V_{IN}$ from the solar panel 20 with the current threshold $I_T$ and the voltage threshold $V_T$ to switch the operation modes.

Figure 14:
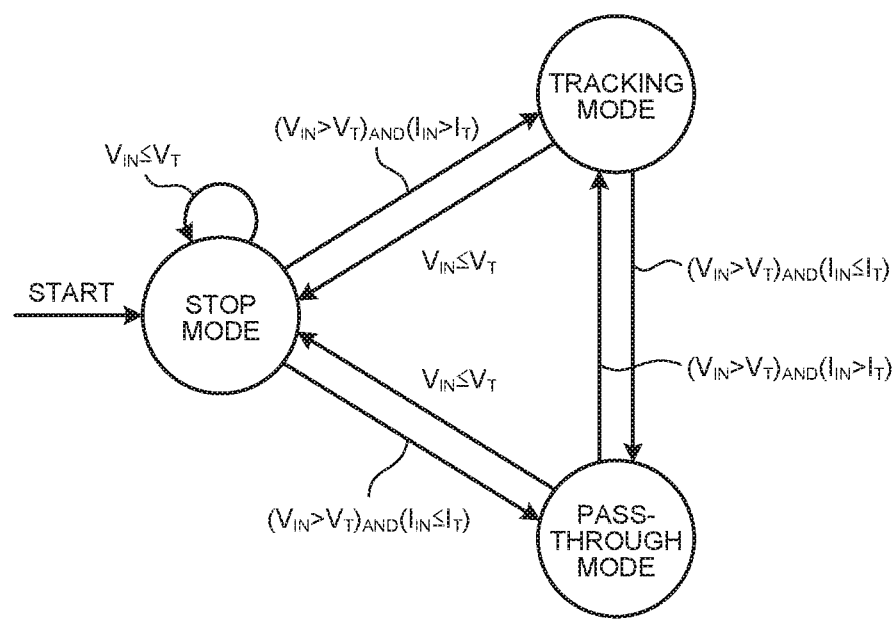
FIG. 14 is a state transition diagram of the operation modes in the first embodiment.

FIG. 14 is a state transition diagram of the operation modes in the first embodiment. At start of power generation by the corresponding solar panel 20, the mode controller 112 sets the power convertor 30 in the stop mode.

In the stop mode, the mode controller 112 compares the input voltage $V_{IN}$ with the voltage threshold $V_T$. At the input voltage $V_{IN}$ being equal to or less than the voltage threshold $V_T$ in the stop mode, the mode controller 112 maintains the stop mode of the power convertor 30.

In the stop mode, with the input voltage $V_{IN}$ exceeding the voltage threshold $V_T$ and the input current $I_{IN}$ being the current threshold $I_T$ or less, the mode controller 112 controls the power convertor 30 to transition to the pass-through mode. In the stop mode, with the input voltage $V_{IN}$ exceeding the voltage threshold $V_T$ and the input current $I_{IN}$ exceeding the current threshold $I_T$, the mode controller 112 controls the power convertor 30 to transition to the tracking mode.

In the pass-through mode, at the input voltage $V_{IN}$ decreasing to the voltage threshold $V_T$ or less, the mode controller 112 controls the power convertor 30 to transition to the stop mode. In the pass-through mode, with the input voltage $V_{IN}$ exceeding the voltage threshold $V_T$ and the input current $I_{IN}$ exceeding the current threshold $I_T$, the mode controller 112 controls the power convertor 30 to transition to the tracking mode.

In the tracking mode, at the input voltage $V_{IN}$ being the voltage threshold $V_T$ or less, the mode controller 112 controls the power convertor 30 to transition to the stop mode. In the tracking mode, with the input voltage $V_{IN}$ exceeding the voltage threshold $V_T$ and the input current $I_{IN}$ being the current threshold $I_T$ or less, the mode controller 112 controls the power convertor 30 to transition to the pass-through mode.

The amount of power that can be generated by the solar panel 20 greatly varies depending on time of day and weather. Thus, in the morning or evening or due to cloudy weather, for example, the solar panel 20 can generate only small amount of power. In such a situation the switch driver 108 consumes a larger amount of power for driving the switches than increased amount of generated power through the maximum power-point tracking. At the time of the input current $I_{IN}$ decreasing to the preset current threshold $I_T$ or less, the power convertor 30 according to the present embodiment sets the buck-boost circuit 50 in the pass-through mode to stop switching. In this manner, with the input current $I_{IN}$ being the preset current threshold $I_T$ or less, the power convertor 30 according to the present embodiment can prevent the switch driver 108 from consuming power for driving the switches, and can efficiently output the power generated by the solar panels 20.

Second Embodiment

Figure 15:
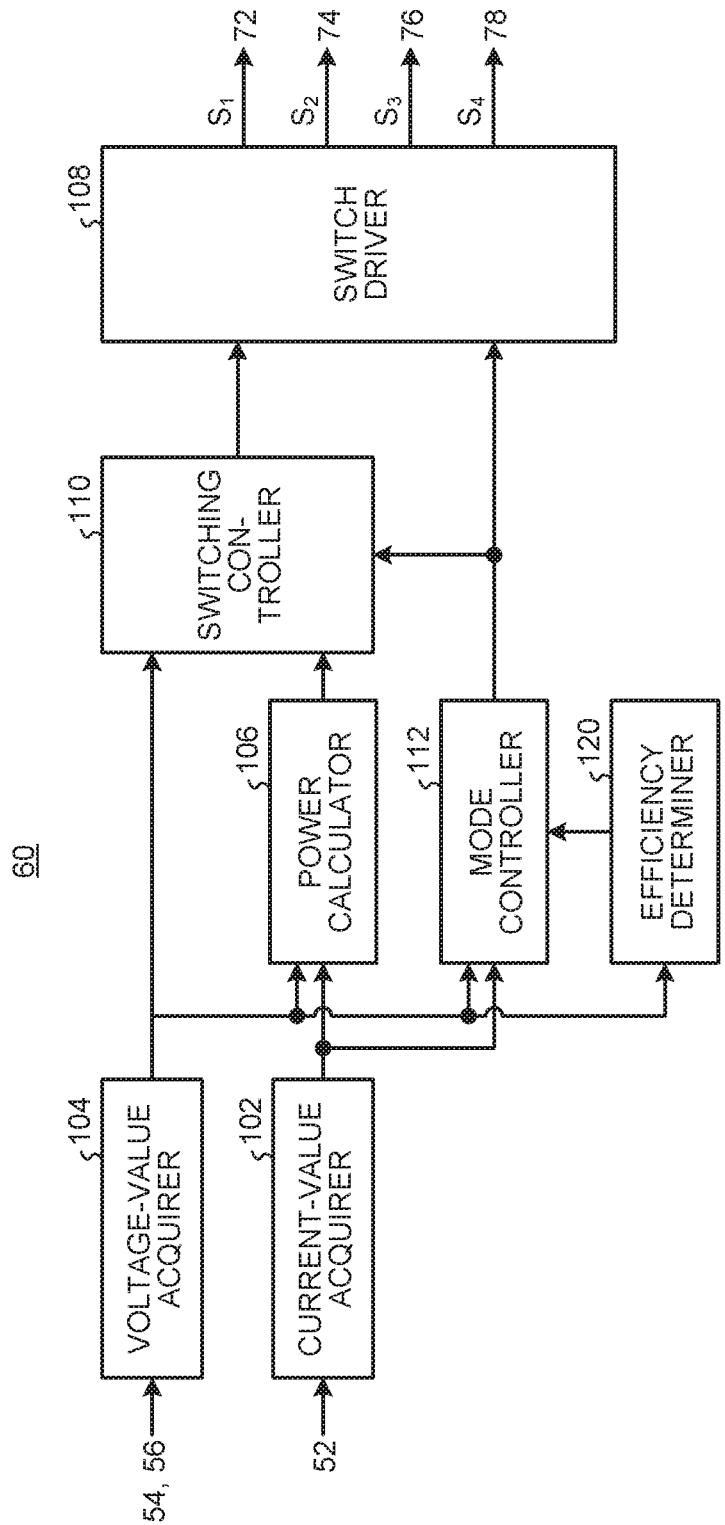
FIG. 15 is a diagram illustrating an exemplary functional configuration of a controller according to a second embodiment.

FIG. 15 is a diagram illustrating an exemplary functional configuration of a controller 60 according to a second embodiment. The controller 60 according to the second embodiment further includes an efficiency determiner 120.

The efficiency determiner 120 determines whether the solar panel 20 is in a general efficiency state or in a low efficiency state. In the general efficiency state the solar panel 20 exhibits given power generation efficiency. In the low efficiency state the solar panel 20 exhibits lower power generation efficiency than in the general efficiency state.

The solar panel 20 includes a plurality of clusters. All of the clusters of the solar panel 20 in normal operation receive solar light to generate power. However, if part of the clusters is shaded, the shaded clusters do not contribute to the power generation, lowering the power generation efficiency of the solar panel 20 from in ordinary state. While the solar panel 20 normally receives solar light to generate power, for example, the efficiency determiner 120 determines that the solar panel 20 is in the general efficiency state. If the solar panel 20 fails to normally receive solar light to generate power, the efficiency determiner 120 determines that the solar panel 20 is in the low efficiency state.

For example, the efficiency determiner 120 acquires a value of an input voltage $V_{IN}$ output from the corresponding solar panel 20. The efficiency determiner 120 determines whether the solar panel 20 is in a general efficiency state or a low efficiency state from the value of the input voltage $V_{IN}$.

At the input voltage $V_{IN}$ of the value exceeding a preset voltage value, the efficiency determiner 120 may determine that the solar panel 20 is in the general efficiency state, and determine that the solar panel 20 is in the low efficiency state when the value of the input voltage $V_{IN}$ is equal to or less than the preset voltage value.

The mode controller 112 according to the second embodiment acquires a result of the determination as to whether the solar panel 20 in question is in the general efficiency state or in the low efficiency state, from the efficiency determiner 120.

When the solar panel 20 is determined to be in the general efficiency state in the tracking mode, that is, the input voltage $V_{IN}$ is larger than the voltage threshold $V_T$ and the input current $I_{IN}$ is equal to or larger than the current threshold $I_T$, the mode controller 112 sets the power converter 30 in a tracking pass-through mode. In the tracking pass-through mode, the mode controller 112 causes the switching controller 110 to stop the maximum power-point tracking. In the tracking pass-through mode, the mode controller 112 instructs the switch driver 108 to control the buck-boost circuit 50 to output the input voltage $V_{IN}$ directly as the output voltage $V_{OUT}$ without power conversion.

When the solar panel 20 is determined to be in the low efficiency state in the tracking pass-through mode, the mode controller 112 sets the power converter 30 in the tracking mode. In the tracking mode, the mode controller 112 controls the switching controller 110 to execute the maximum power-point tracking.

Figure 16:
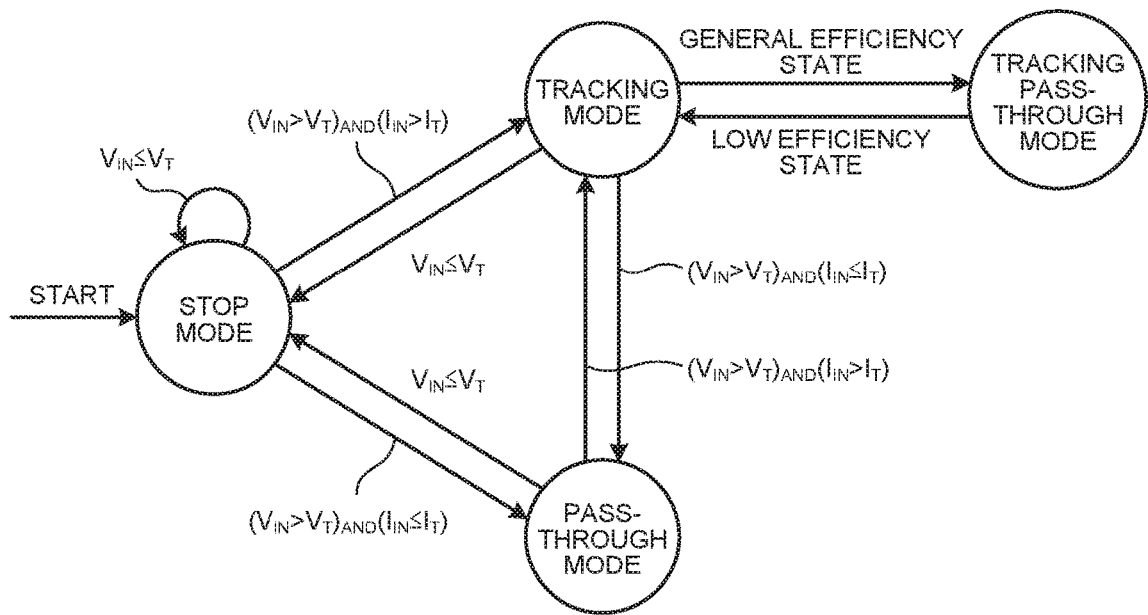
FIG. 16 is a state transition diagram of operation modes in the second embodiment.

FIG. 16 is a state transition diagram of the operation modes in the second embodiment. The power convertor 30 according to the second embodiment operates in four operation modes: a stop mode, a tracking mode, a pass-through mode, and a tracking pass-through mode.

When the solar panel 20 is determined to be in the general efficiency state in the tracking mode, the mode controller 112 controls the power converter 30 to transition to the tracking pass-through mode. In the tracking pass-through mode, when the solar panel 20 is determined to be in the low efficiency state, the mode controller 112 controls the power converter 30 to transition to the tracking mode.

Specifically, while the input voltage $V_{IN}$ is larger than the voltage threshold $V_T$ and the input current $I_{IN}$ is larger than the current threshold $I_T$, and the solar panel 20 is in the general efficiency state, such as when all of clusters normally receive solar light to generate power, the mode controller 112 sets the power converter 30 in the tracking pass-through mode. While the input voltage $V_{IN}$ is larger than the voltage threshold $V_T$ and the input current $I_{IN}$ is larger than the current threshold $I_T$, and the solar panel 20 is in the low efficiency state, such as when part of the clusters is shaded to generate power at lower efficiency, the mode controller 112 sets the power converter 30 in the tracking mode.

In the tracking pass-through mode, the mode controller 112 executes the same control as in the pass-through mode. Specifically, the mode controller 112 gives a pass-through mode command to the switch driver 108. In response to the pass-through mode command from the mode controller 112, the switch driver 108 turns on the first switch 72, turns off the second switch 74, turns on the third switch 76, and turns off the fourth switch 78. In this manner, the buck-boost circuit 50 can output the input voltage $V_{IN}$ directly as the output voltage $V_{OUT}$ without power conversion.

In the present embodiment, the power conditioner 24 executes maximum power-point tracking control over the whole solar panels 20. Meanwhile, the power convertor 30 executes maximum power-point tracking control over one solar panel 20. Without being shaded, the solar panel 20 can operate in the general efficiency state at the maximum power point by the maximum power-point tracking control by the power conditioner 24 under no control of the power convertor 30. While being shaded, however, the solar panel 20 cannot operate at the maximum power point unless controlled by the power convertor 30. The other solar panels 20 in the same string cannot operate at the maximum power point, either.

In the general efficiency state of the corresponding solar panel 20, the power convertor 30 according to the present embodiment outputs the input voltage $V_{IN}$ directly as the output voltage $V_{OUT}$ without power conversion. Thus, in the general efficiency state of the solar panel 20, the power convertor 30 can avoid unnecessary power consumption and control the corresponding solar panel 20 to operate at the maximum power point.

The power convertor 30 can execute maximum power-point tracking control over the corresponding solar panel 20 operating in the low efficiency state. Thus, the power convertor 30 can operate the corresponding solar panel 20 at the maximum power point in the low efficiency state. In this manner, the power convertor 30 according to the present embodiment can efficiently operate the solar panel 20 with less power consumption.

Figure 17:
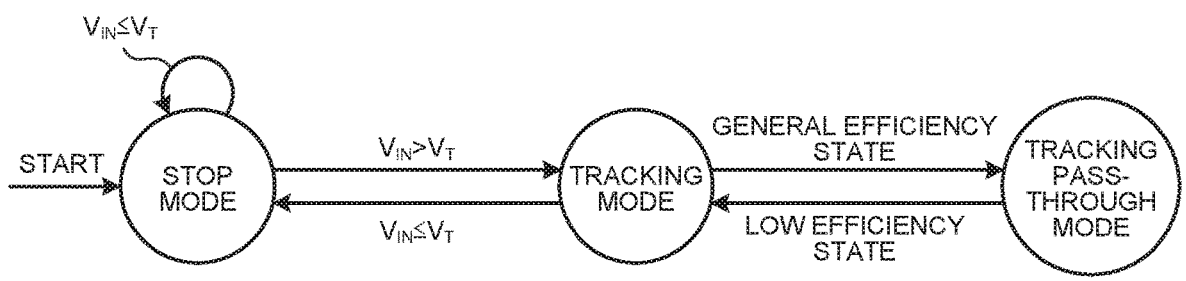
FIG. 17 is a state transition diagram of operation modes in a modification of the second embodiment.

FIG. 17 is a state transition diagram of the operation modes in a modification of the second embodiment. As illustrated in FIG. 17, the power convertor 30 according to the present embodiment may not transition to the pass-through mode if the input current $I_{IN}$ is the current threshold $I_T$ or less.

In such a configuration, as long as the solar panel 20 operates in the general efficiency state, the power convertor 30 can directly output the input voltage $V_{IN}$ as the output voltage $V_{OUT}$ without power conversion. Further, the power convertor 30 can execute maximum power-point tracking control over the corresponding solar panel 20 operating in the low efficiency state. That is, the power convertor 30 can efficiently operate the solar panel 20 with less power consumption.

Third Embodiment

Figure 18:
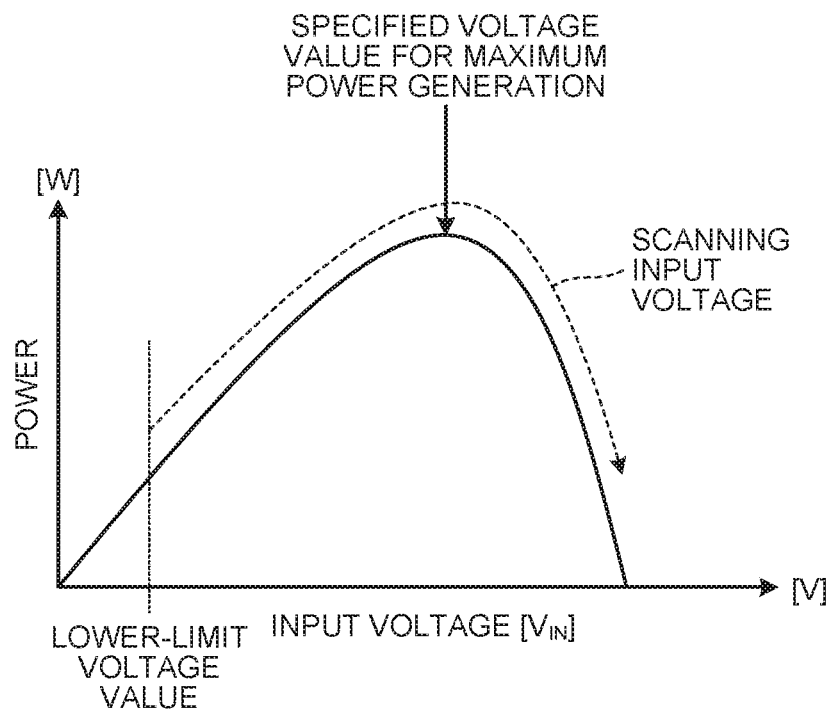
FIG. 18 is a diagram for illustrating a variation in input voltage during scanning in a third embodiment.

FIG. 18 is a diagram illustrating a variation in input voltage $V_{IN}$ during scanning in a third embodiment. A power convertor 30 according to the third embodiment executes scanning as maximum power-point tracking.

In scanning, the switching controller 110 causes the buck-boost circuit 50 to temporarily stop power conversion and opens the output end of the buck-boost circuit 50. Subsequently, the switching controller 110 varies a value of an input voltage $V_{IN}$ from the solar panel 20 in a given range to determine a value of the input voltage $V_{IN}$ at which maximum power is generated.

In the present embodiment, the switching controller 110 varies the input voltage $V_{IN}$ in the range from a preset lower-limit value. The lower-limit value refers to a voltage at which the power supply 62 can operate the controller 60 including the switch driver 108.

Subsequently, the switching controller 110 calculates an amount of control over the power conversion so that the input voltage $V_{IN}$ from the solar panel 20 turns to the determined voltage value. In the present embodiment, the switching controller 110 calculates a target conversion ratio at which the input voltage $V_{IN}$ from the solar panel 20 turns to the determined voltage value. The control amount is not limited to the target conversion ratio, and may be another amount. For example, the control amount may be a duty ratio of the switching between the first switch 72 and the second switch 74 or between the third switch 76 and the fourth switch 78.

The switching controller 110 resumes power conversion with the determined control amount. In the present embodiment, the switching controller 110 performs switching of the buck-boost circuit 50 at the target conversion ratio so that the solar panel 20 generates the input voltage $V_{IN}$ of the determined value. Through such operation, the switching controller 110 can operate the solar panel 20 at a maximum power point unless the situation changes.

Figure 19:
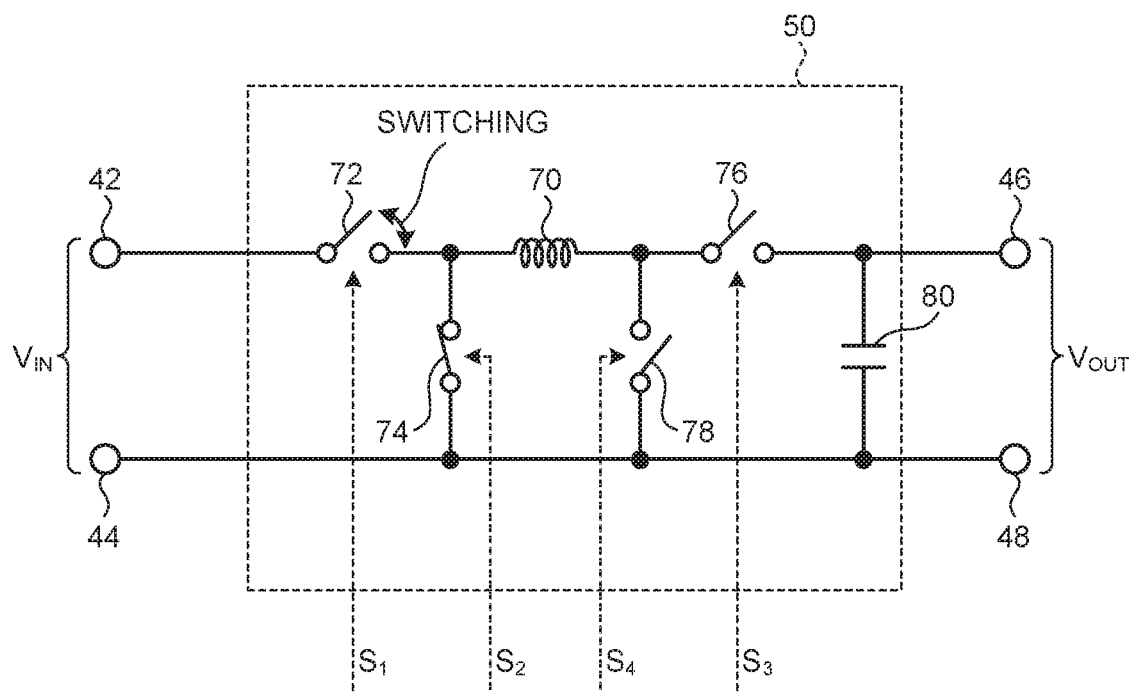
FIG. 19 is a diagram illustrating the states of switches in the buck-boost circuit when a value of an input voltage from the solar panel varies in a given range.

FIG. 19 is a diagram illustrating the states of the switches in the buck-boost circuit 50 in the case of varying a value of an input voltage $V_{IN}$ from the solar panel 20 in a given range.

To vary the value of the input voltage $V_{IN}$ from the solar panel 20, the switching controller 110 performs switching as illustrated in FIG. 19. That is, the switching controller 110 causes the buck-boost circuit 50 to stop outputting the output voltage $V_{OUT}$. More specifically, the switching controller 110 turns off the third switch 76 and turns off the fourth switch 78 to open the path between the positive output terminal 46 and the negative output terminal 48.

The switching controller 110 repeatedly turns on and off the path between the positive input terminal 42 and the negative input terminal 44 of the buck-boost circuit 50 while changing the duty factor, thereby changing the value of the input voltage $V_{IN}$.

To set the input voltage $V_{IN}$ from the solar panel 20 to a target value, for example, the switching controller 110 fixedly turns on the second switch 74 and switches on and off the first switch 72 at a duty factor corresponding to the target voltage value, i.e., repeatedly turns it on and off in a given cycle. To decrease the value of the input voltage $V_{IN}$, the switching controller 110 increases the duty factor, that is, elongates the on-period of the first switch 72. To increase the value of the input voltage $V_{IN}$, the switching controller 110 decreases the duty factor, that is, shortens the on-period of the first switch 72.

The switching controller 110 varies the input voltage $V_{IN}$ from the solar panel 20 in a range over the lower-limit value. Thus, the switching controller 110 varies the duty factor in a range from a preset value.

In the present embodiment, the switching controller 110 switches the first switch 72 while the second switch 74 is fixedly ON. Alternatively, the switching controller 110 may switch the second switch 74 while the first switch 72 is fixedly ON.

Figure 20:
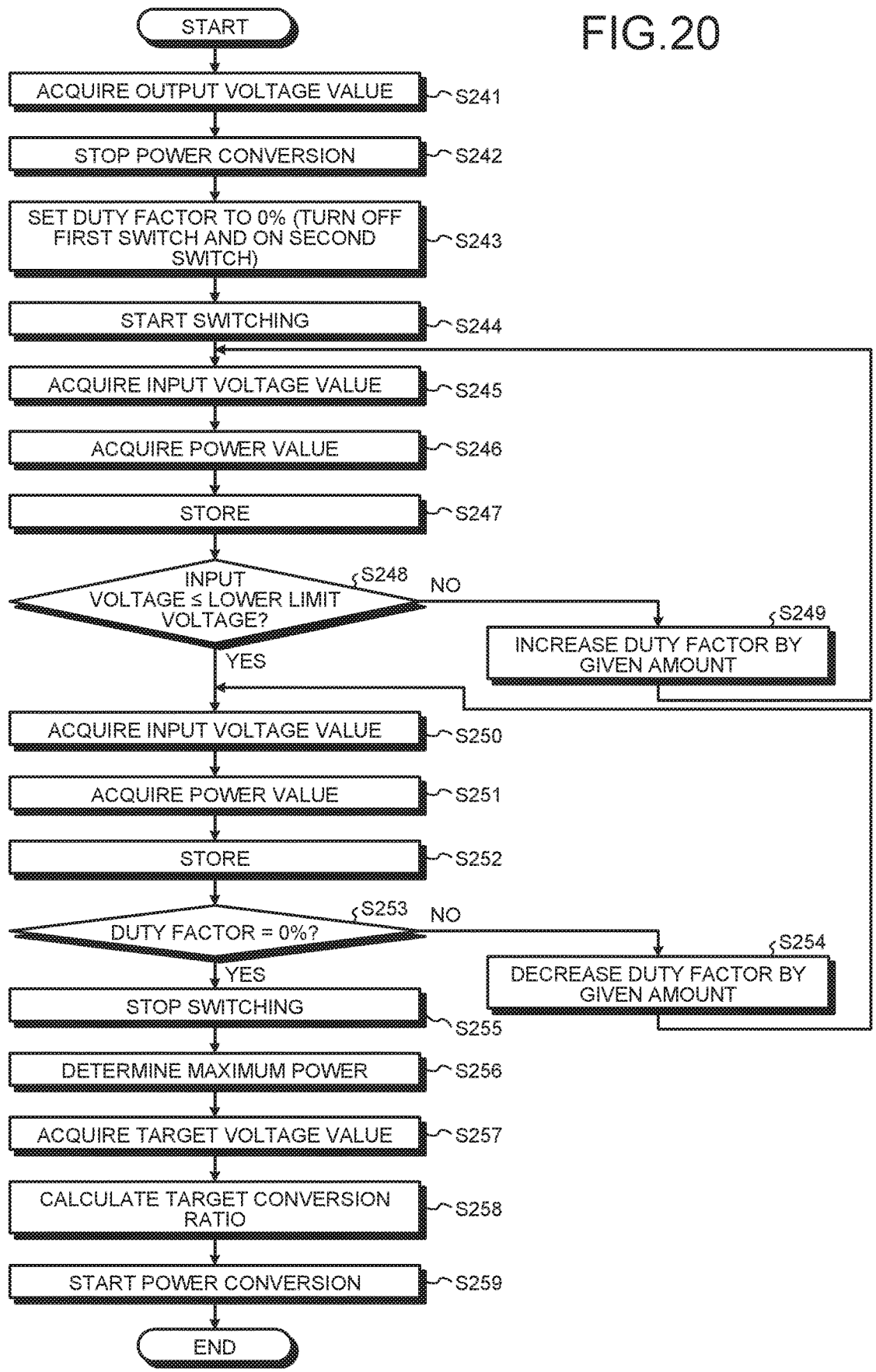
FIG. 20 is a flowchart of the processing of a switching controller according to the third embodiment.

FIG. 20 is a flowchart illustrating the processing of the switching controller 110 according to the third embodiment.

In the tracking mode, the switching controller 110 regularly executes the processing illustrated in FIG. 20. For example, the switching controller 110 executes the processing illustrated in FIG. 20 in unit of given time or at timing at which a given event occurs.

First, at S241, the switching controller 110 acquires a value of an output voltage $V_{OUT}$ from the buck-boost circuit 50.

Subsequently, at S242, the switching controller 110 causes the buck-boost circuit 50 to stop converting power, and opens the output end of the buck-boost circuit 50. Specifically, the switching controller 110 turns off the first switch 72, turns on the second switch 74, turns off the third switch 76, and turns off the fourth switch 78. In this manner, the switching controller 110 can increase the value of the input voltage $V_{IN}$ to a maximum, placing the path between the positive output terminal 46 and the negative output terminal 48 in open state.

At S243, the switching controller 110 sets the duty factor to 0%. At S244, the switching controller 110 starts switching the first switch 72 while the second switch 74 is fixedly ON. The switching controller 110 switches on and off the first switch 72 at the set duty factor. Immediately after the start of this processing, the first switch 72 is OFF due to the set duty factor of 0%.

At S245, the switching controller 110 acquires a value of the input voltage $V_{IN}$. At S246, the switching controller 110 acquires a power value. At S247, the switching controller 110 stores the value of the input voltage $V_{IN}$ and the power value in association with each other.

Subsequently, at S248, the switching controller 110 determines whether the input voltage $V_{IN}$ is equal to or lower than a preset lower-limit value. When the input voltage $V_{IN}$ is not equal to or lower than the lower-limit value (No at S248), the switching controller 110 proceeds to S249. At S249, the switching controller 110 increases the duty factor by a given amount, returns to S245, and repeats the processing from S245.

When the input voltage $V_{IN}$ is equal to or lower than the lower-limit value (Yes at S248), the switching controller 110 proceeds to S250. At S250, the switching controller 110 acquires a value of the input voltage $V_{IN}$. Subsequently, at S251, the switching controller 110 acquires a power value. At S252, the switching controller 110 stores the value of the input voltage $V_{IN}$ and the power value in association with each other.

At S253, the switching controller 110 determines whether the duty factor is 0%. With the duty factor being other than 0% (No at S253), the switching controller 110 proceeds to S254. At S254, the switching controller 110 decreases the duty factor by a given amount, returns to S250, and repeats the processing from S250.

With the duty factor being 0% (Yes at S253), the switching controller 110 proceeds to S255. At S255, the switching controller 110 stops switching the first switch 72 while the duty factor is 0%. Specifically, the switching controller 110 turns off the first switch 72.

Subsequently, at S256, the switching controller 110 specifies the maximum power value from the stored power values. At S257, the switching controller 110 determines, as a target voltage value, a value of an input voltage $V_{IN}$ stored in association with the specified maximum power value.

At S258, the switching controller 110 calculates, from the target voltage value, a target conversion ratio at which the solar panel 20 can generate maximum DC power. For example, the switching controller 110 calculates a ratio of the value of the output voltage $V_{OUT}$ acquired at S241 to the determined target voltage value, and sets the calculated ratio as a target conversion ratio.

At S259, the switching controller 110 controls the buck-boost circuit 50 to start power conversion at the calculated target conversion ratio.

Figure 21:
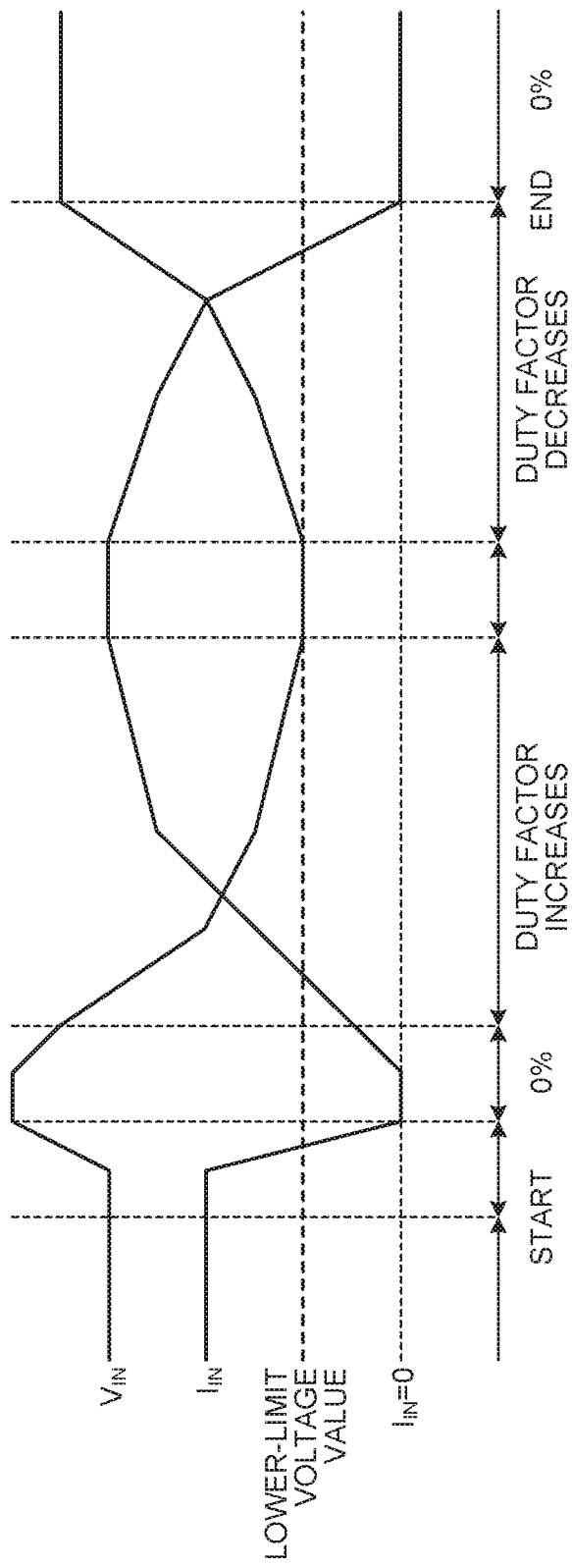
FIG. 21 is a diagram illustrating variations in input voltage and input current in the processing in FIG. 20.

FIG. 21 is a diagram illustrating variations in input voltage $V_{IN}$ and input current $I_{IN}$ during the procedure in FIG. 20.

Through the procedure of the switching controller 110 illustrated in FIG. 20, the input voltage $V_{IN}$ and the input current $I_{IN}$ vary as illustrated in FIG. 21. Specifically, in the initial stage of the duty factor being 0%, the input voltage $V_{IN}$ exhibits the maximum value and the input current $I_{IN}$ exhibits zero. Along with a gradual increase in the duty factor from 0%, the input voltage $V_{IN}$ gradually decreases and the input current $I_{IN}$ gradually increases. The input voltage $V_{IN}$ no longer decreases after reaching the lower-limit value.

Thereafter, along with a gradual decrease in the duty factor, the input voltage $V_{IN}$ gradually increases and the input current $I_{IN}$ gradually decreases. The processing completes when the input current $I_{IN}$ falls to zero.

After the input voltage $V_{IN}$ falls to the lower-limit value, the switching controller 110 does not immediately set the duty factor to 0% but gradually decreases the duty factor to 0%. Thereby, the switching controller 110 can protect the circuitry without causing back electromotive force due to inductance components of wiring impedance.

In the present embodiment, the power convertor 30 is driven by the power generated by the solar panel 20. Consequently, the power convertor 30 is operable with no receipt of power from outside.

In the maximum power-point tracking by scanning, however, setting the value of the input voltage $V_{IN}$ generated from the solar panel 20 to the minimum value (for example, zero) may cause the power convertor 30 to receive no power from the solar panel 20 and stop operating. In view of this, through the maximum power-point tracking by scanning, the power convertor 30 according to the present embodiment controls the input voltage $V_{IN}$ from the solar panel 20 not to fall below the preset lower-limit value. Consequently, the power convertor 30 according to the present embodiment can reliably determine the maximum power point without stopping its operation in the maximum power-point tracking by scanning.

Fourth Embodiment

Figure 22:
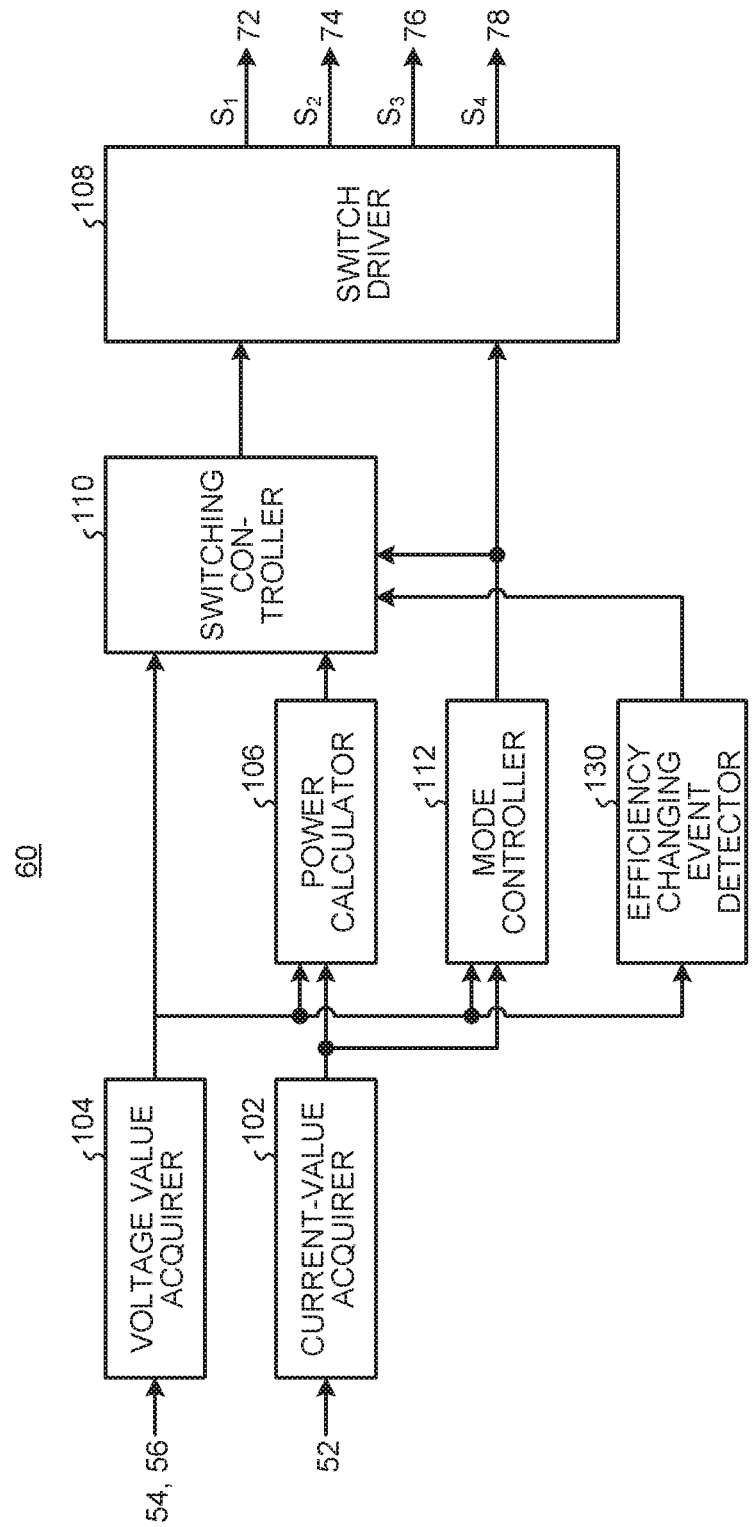
FIG. 22 is a diagram illustrating an exemplary functional configuration of a controller according to a fourth embodiment.

FIG. 22 is a diagram illustrating an exemplary functional configuration of a controller 60 according to a fourth embodiment. The controller 60 according to the fourth embodiment further includes an efficiency changing event detector 130.

The controller 60 in FIG. 22 has the functional configuration including the efficiency changing event detector 130 in addition to the elements of the controller 60 of the first embodiment illustrated in FIG. 4. However, the efficiency changing event detector 130 may be added to the functional configuration of the controller 60 of the second embodiment illustrated in FIG. 15.

The efficiency changing event detector 130 detects occurrence or non-occurrence of an efficiency changing event that the power generation efficiency of the solar panel 20 varies by a preset value or more.

For example, the solar panel 20 including three clusters generates power at 100% efficiency when all of the three clusters normally receive solar to generate power. However, if one of the three clusters is shadowed, for example, the solar panel 20 generates power at 66% efficiency. If two of the three clusters are shadowed, the solar panel 20 generates power at 33% efficiency.

In such cases, for example, the efficiency changing event detector 130 detects a change in power generation efficiency of the solar panel 20 from 100% to 66%, and a change in power generation efficiency of the solar panel 20 from 66% to 33%. The efficiency changing event detector 130 may detect a change in power generation efficiency of the solar panel 20 from 33% to 66%, and a change in power generation efficiency of the solar panel 20 from 66% to 100%.

The efficiency changing event detector 130 may determine whether the power generation efficiency has changed by a preset value or more, from the value of the input voltage $V_{IN}$, for example. The efficiency changing event detector 130 may determine that the power generation efficiency has changed by a preset value or more, when the value of the input voltage $V_{IN}$ has changed by a preset value or more.

The switching controller 110 can execute two types of maximum power-point tracking control, i.e., by scanning and by hill climbing. The switching controller 110 switches the control between by scanning and by hill climbing in response to an efficiency changing event.

FIG. 23 is a state transition diagram of the switching controller 110 according to the fourth embodiment. The switching controller 110 switches the control by scanning and the control by hill climbing at the timing illustrated in FIG. 23.

During no occurrence of an efficiency changing event, the switching controller 110 executes maximum power-point tracking by hill climbing. If an efficiency changing event occurs during the maximum power-point tracking by hill climbing, the switching controller 110 terminates the maximum power-point tracking by hill climbing, and executes maximum power-point tracking by scanning.

In the control by scanning, the switching controller 110 determines a value of an input voltage $V_{IN}$ at which the solar panel 20 generates maximum DC power. The switching controller 110 further determines a control amount for the power conversion such that the solar panel 20 generates maximum DC power.

In the present embodiment, the switching controller 110 determines, as the control amount, a target conversion ratio at which the solar panel 20 generates maximum DC power. The control amount is not limited to the target conversion ratio, and may be another amount. For example, the control amount may be a duty ratio for switching on and off the first switch 72 and the second switch 74 or a duty ratio for switching on and off the third switch 76 or the fourth switch 78.

After the maximum power-point tracking by scanning, the switching controller 110 takes over the control amount of power conversion for generating the maximum DC power, and starts maximum power-point tracking by hill climbing. In the present embodiment, after the maximum power-point tracking by scanning, the switching controller 110 starts maximum power-point tracking by hill climbing, taking over a target conversion ratio.

FIG. 24 is a diagram illustrating an exemplary variation in a characteristic curve representing generated power with respect to generated voltage when an efficiency changing event has occurred. The solar panel 20, while operating in the general efficiency state such as at power generation efficiency of 100%, exhibits a characteristic curve with one peak point. However, with a decrease in the power generation efficiency caused by partial shading of the solar panel 20, for example, the solar panel 20 may exhibit a characteristic curve with two or more peak points.

Thus, upon occurrence of an efficiency changing event, continuation of hill climbing may cause the power convertor 30 to increase or decrease in the target conversion ratio such that the voltage value reciprocates around a peak point other than the maximum power point.

However, in response to occurrence of an efficiency changing event, the power convertor 30 according to the present embodiment detects a maximum power point through the maximum power-point tracking by scanning. Thereby, the power convertor 30 can detect a maximum power point from the characteristic curve with two or more peak points representing generated power with respect to generated voltage. Further, the power convertor 30 takes over a control amount (for example, target conversion ratio) for the maximum power-point tracking by scanning, to execute maximum power-point tracking by hill climbing. Thus, the power convertor 30 can avoid increasing or decreasing in the control amount (for example, target conversion ratio) such that the voltage value reciprocates around a peak point other than the maximum power point. Consequently, the power convertor 30 can operate the solar panel 20 at the maximum power point irrespective of decrease in the power generation efficiency.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A power convertor, comprising:
a buck-boost circuit to be applied with an input voltage to convert the input voltage into an output voltage for output, thereby performing power conversion, the input voltage being generated by a power generation module that generates direct-current power;
a switch driver powered by the direct-current power generated by the power generation module, to switch the buck-boost circuit;
a switching controller that controls the switch driver to perform maximum power-point tracking to control the power conversion of the buck-boost circuit such that the power generation module generates maximum direct-current power; and
a positive input terminal and a negative input terminal to be applied with the input voltage generated by the power generation module,
wherein, as the maximum power-point tracking, the switching controller:
causes the buck-boost circuit to stop outputting the output voltage, thereby terminating the power conversion, and, in such a state, causes the voltage value of the input voltage from the power generation module to vary in a prescribed voltage range by turning on and off a switch provided in a current path between the positive input terminal and the negative input terminal in the buck-boost circuit while varying a duty factor of the turning on and off of the switch, a lowest voltage value of the prescribed voltage range being equal to or greater than a lowest voltage value at which the switch driver is operable so that the switch driver is sufficiently powered by the input voltage while the voltage value of the input voltage is caused to vary in the prescribed voltage range;
detects a direct-current power between the positive input terminal and negative input terminal generated while the voltage value of the input voltage is caused to vary in the prescribed voltage range so as to obtain a relationship between the direct-current power and the input voltage;
determines, from the obtained relationship between the direct-current power and the input voltage, a voltage value at which the power generation module generates the maximum direct-current power; and
thereafter, resumes the power conversion of the input voltage to the output voltage by controlling the buck-boost circuit such that the input voltage turns to the determined voltage value, thereby causing the power generation module to generate the maximum direct-current power.

2. The power convertor according to claim 1, wherein:
the switching controller controls the power conversion of the buck-boost circuit in accordance with a target conversion ratio, the target conversion ratio representing a target ratio of a voltage value of the output voltage with respect to a voltage value of the input voltage, and
the switching controller causes the buck-boost circuit to convert power at the target conversion ratio at which the input voltage turns to the determined voltage value.

3. The power convertor according to claim 2, wherein when a prescribed condition is met at the power generation module, the switching controller is configured to control the switch driver such that the buck-boost circuit outputs the input voltage as the output voltage without power conversion.

4. The power convertor according to claim 2, further comprising:
a positive output terminal and a negative output terminal that output the output voltage, wherein the buck-boost circuit comprises:
an inductor;
a first switch for turning on and off a path between the positive input terminal and a first terminal of the inductor;
a second switch for turning on and off a path between the negative input terminal and the first terminal of the inductor;
a third switch for turning on and off a path between a second terminal of the inductor and the positive output terminal;
a fourth switch for turning on and off a path between the second terminal of the inductor and the negative output terminal; and
a capacitor connected between the positive output terminal and the negative output terminal.

5. The power convertor according to claim 4, wherein the switch driver drives the first switch, the second switch, the third switch, and the fourth switch.

6. The power convertor according to claim 5, wherein when the target conversion ratio is less than 100%, the switching controller turns on the third switch and off the fourth switch, and complementally switches on and off the first switch and the second switch;
when the target conversion ratio is larger than 100%, the switching controller turns on the first switch and off the second switch, and complementally switches on and off the third switch and the fourth switch.

7. The power convertor according to claim 6, wherein when the target conversion ratio is less than 100%, the switching controller complementally switches on and off the first switch and the second switch such that an on-period of the first switch with respect to a switching cycle is set to a proportion corresponding to the target conversion ratio, and
when the target conversion ratio is larger than 100%, the switching controller complementally switches on and off the third switch and the fourth switch such that an on-period of the third switch with respect to the switching cycle is set to a proportion, the proportion corresponding to a value found by dividing, by the target conversion ratio, a value being a resultant of subtracting 100% from the target conversion ratio.

8. The power convertor according to claim 1, wherein the power generation module includes a solar panel.

9. The power convertor according to claim 1, further comprising:
a positive output terminal and a negative output terminal that output the output voltage, wherein the buck-boost circuit comprises:
an inductor;
a first switch for turning on and off a path between the positive input terminal and a first terminal of the inductor;
a second switch for turning on and off a path between the negative input terminal and the first terminal of the inductor;
a third switch for turning on and off a path between a second terminal of the inductor and the positive output terminal;
a fourth switch for turning on and off a path between the second terminal of the inductor and the negative output terminal; and
a capacitor connected between the positive output terminal and the negative output terminal,
wherein the switching controller causes the buck-boost circuit to stop outputting the output voltage, thereby terminating the power conversion, by turning off the third and fourth switches, and causes the voltage value of the input voltage from the power generation module to vary in the prescribed voltage range by turning on and off one of the first and second switches while varying the duty factor of the turning on and off of the one of the first and second switches and while another of the first and second switches is being turned on.

10. The power convertor according to claim 9, wherein while varying the duty factor in causing the voltage value of the input voltage to vary in the prescribed voltage range in the maximum power-point tracking, the switching controller monitors the input voltage and adjust the duty factor of turning on and off said one of the first and second switches such that the input voltage is not lowered below the lowest voltage value at which the switch driver is operable.

11. The power convertor according to claim 1, wherein while varying the duty factor in causing the voltage value of the input voltage to vary in the prescribed voltage range in the maximum power-point tracking, the switching controller monitors the input voltage and adjust the duty factor such that the input voltage is not lowered below the lowest voltage value at which the switch driver is operable.

12. A power generation system, comprising:
a plurality of power generation modules connected in series, each of which generates direct-current power; and
at least one power convertor attached to at least one of the power generation modules,
wherein the power convertor comprises:
a buck-boost circuit to be applied with an input voltage to convert the input voltage into an output voltage for output, thereby performing power conversion, the input voltage being generated by the at least one of the power generation modules;
a switch driver powered by the direct-current power generated by the at least one of the power generation modules, to switch the buck-boost circuit;
a switching controller that controls the switch driver to perform maximum power-point tracking to control the power conversion of the buck-boost circuit such that the at least one of the power generation modules generates maximum direct-current power; and
a positive input terminal and a negative input terminal to be applied with the input voltage generated by the at least one of the power generation modules,
wherein, as the maximum power-point tracking, the switching controller:
causes the buck-boost circuit to stop outputting the output voltage, thereby terminating the power conversion, and, in such a state, causes the voltage value of the input voltage from the power generation module to vary in a prescribed voltage range by turning on and off a switch provided in a current path between the positive input terminal and the negative input terminal in the buck-boost circuit while varying a duty factor of the turning on and off of the switch, the prescribed voltage range being equal to or greater than a lowest voltage value at which the switch driver is operable so that the switch driver is sufficiently powered by the input voltage while the voltage value of the input voltage is caused to vary in the prescribed voltage range;
detects a direct-current power between the positive input terminal and negative input terminal generated while the voltage value of the input voltage is caused to vary in the prescribed voltage range so as to obtain a relationship between the direct-current power and the input voltage;
determines, from the obtained relationship between the direct-current power and the input voltage, a voltage value at which the at least one of the power generation modules generates the maximum direct-current power; and
thereafter, resumes the power conversion of the input voltage to the output voltage by controlling the buck-boost circuit such that the input voltage turns to the determined voltage value, thereby causing the power generation module to generate the maximum direct-current power.

13. A power generation control method for controlling a power generation system comprising a plurality of power generation modules connected in series, each of the power generation modules generating direct-current power, at least one of the power generation modules being subjected to power conversion by a power convertor, the power convertor comprising a buck-boost circuit to be applied with an input voltage to convert the input voltage into an output voltage for output, thereby performing power conversion, the input voltage being generated by the at least one of the power generation modules; a switch driver powered by the direct-current power generated by the at least one of the power generation modules, to switch the buck-boost circuit; and a positive input terminal and a negative input terminal to be applied with the input voltage generated by the at least one of the power generation modules, the method comprising:
executing maximum power-point tracking to control power conversion of the buck-boost circuit such that the at least one of the power generation modules generates maximum direct-current power;
in the maximum power-point tracking, causing the buck-boost circuit to stop outputting the output voltage, thereby terminating the power conversion, and, in such a state, causing the voltage value of the input voltage from the power generation module to vary in a prescribed voltage range by turning on and off a switch provided in a current path between the positive input terminal and the negative input terminal in the buck-boost circuit while varying a duty factor of the turning on and off of the switch, the prescribed voltage range being equal to or greater than a lowest voltage value at which the switch driver is operable so that the switch driver is sufficiently powered by the input voltage while the voltage value of the input voltage is caused to vary in the prescribed voltage range;

detecting a direct-current power between the positive input terminal and negative input terminal generated while the voltage value of the input voltage is caused to vary in the prescribed voltage range so as to obtain a relationship between the direct-current power and the input voltage;

determining, from the obtained relationship between the direct-current power and the input voltage, a voltage value at which the at least one of the power generation modules generates the maximum direct-current power; and thereafter, resuming the power conversion of the input voltage to the output voltage by controlling the buck-boost circuit such that the input voltage turns to the determined voltage value, thereby causing the power generation module to generate the maximum direct-current power.

* * * * *